(12) United States Patent
Williams et al.

(10) Patent No.: US 11,112,642 B2
(45) Date of Patent: Sep. 7, 2021

(54) METHOD OF DEFINING AN OPTICAL FILTER ELEMENT AND OPTICAL DEVICE COMPRISING A FILTER STRUCTURE

(71) Applicant: Cambridge Enterprise Limited, Cambridge (GB)

(72) Inventors: Calum Williams, Cambridge (GB); Timothy Wilkinson, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 0 days.

(21) Appl. No.: 16/613,604

(22) PCT Filed: May 24, 2018

(86) PCT No.: PCT/GB2018/051419
§ 371 (c)(1),
(2) Date: Nov. 14, 2019

(87) PCT Pub. No.: WO2018/215784
PCT Pub. Date: Nov. 29, 2018

(65) Prior Publication Data
US 2020/0201111 A1    Jun. 25, 2020

(30) Foreign Application Priority Data
May 25, 2017    (GB) .................................... 1708407

(51) Int. Cl.
*G02B 5/00* (2006.01)
*G02F 1/1335* (2006.01)
(Continued)

(52) U.S. Cl.
CPC ....... *G02F 1/133514* (2013.01); *G02B 5/008* (2013.01); *G02B 5/1809* (2013.01);
(Continued)

(58) Field of Classification Search
CPC ........... G02F 1/133514; G02F 2203/10; G02B 5/008; G02B 6/1226; H01L 31/02322
See application file for complete search history.

(56) References Cited

U.S. PATENT DOCUMENTS

2010/0053755 A1*  3/2010  Lee ........................ G02B 5/008
                                                              359/577
2010/0233825 A1    9/2010  Yamada et al.
(Continued)

OTHER PUBLICATIONS

Cheng et al, "Structural Color Printing Based on Plasmonic Metasurfaces of Perfect Light Absorption", Scientific Reports, vol. 5, Article No. 11045, 2015, 10 pages.
(Continued)

*Primary Examiner* — Mariam Qureshi
(74) *Attorney, Agent, or Firm* — Dority & Manning, P.A.

(57) ABSTRACT

The invention relates optical devices, for example pixelated devices such as an optical device having a plurality of coloured pixels, each said pixel comprising a filter structure, the filter structure comprising: a first metallic layer; a dielectric layer over said first metallic layer; and a second metallic layer over said dielectric layer; wherein said second metallic layer comprises a nanostructured metallic layer having a lateral structure with features having at least one characteristic lateral dimension equal to or less than 1 μm, and wherein said second metallic layer is structured to couple light incident on said second metallic layer into at least two absorption modes of the filter structure, one to either side of a target wavelength, such that said filter structure appears coloured at said target wavelength in reflected or transmitted light.

17 Claims, 22 Drawing Sheets

(51) Int. Cl.
*G02B 5/18* (2006.01)
*G02B 5/20* (2006.01)
*G02B 5/28* (2006.01)

(52) U.S. Cl.
CPC ............ *G02B 5/1876* (2013.01); *G02B 5/201* (2013.01); *G02B 5/288* (2013.01)

(56) References Cited

U.S. PATENT DOCUMENTS

| | | |
|---|---|---|
| 2011/0149217 A1 | 6/2011 | Yoon |
| 2012/0262500 A1* | 10/2012 | Kitazawa ............. G02B 5/3058 345/690 |
| 2015/0124306 A1* | 5/2015 | Bartoli ................... G02B 5/008 359/241 |
| 2016/0195766 A1* | 7/2016 | Kim ................. G02F 1/133533 349/97 |
| 2016/0254303 A1* | 9/2016 | Takimoto ............. G01J 3/0259 257/432 |
| 2018/0107015 A1* | 4/2018 | Dumpelmann .......... G02B 1/08 |

OTHER PUBLICATIONS

Hibbins et al, "Resonant Absorption of Electromagnetic Fields by Surface Plasmons Buried in a Multilayered Plasmonic Nanostructure", Physical Review B, vol. 74, Dec. 2006, 4 pages.

International Search Report and Written Opinion for PCT/GB2018/051419, dated Sep. 13, 2018, 18 pages.

International Preliminary Report on Patentability for PCT/GB2018/051419, dated Nov. 26, 2019, 10 pages.

\* cited by examiner

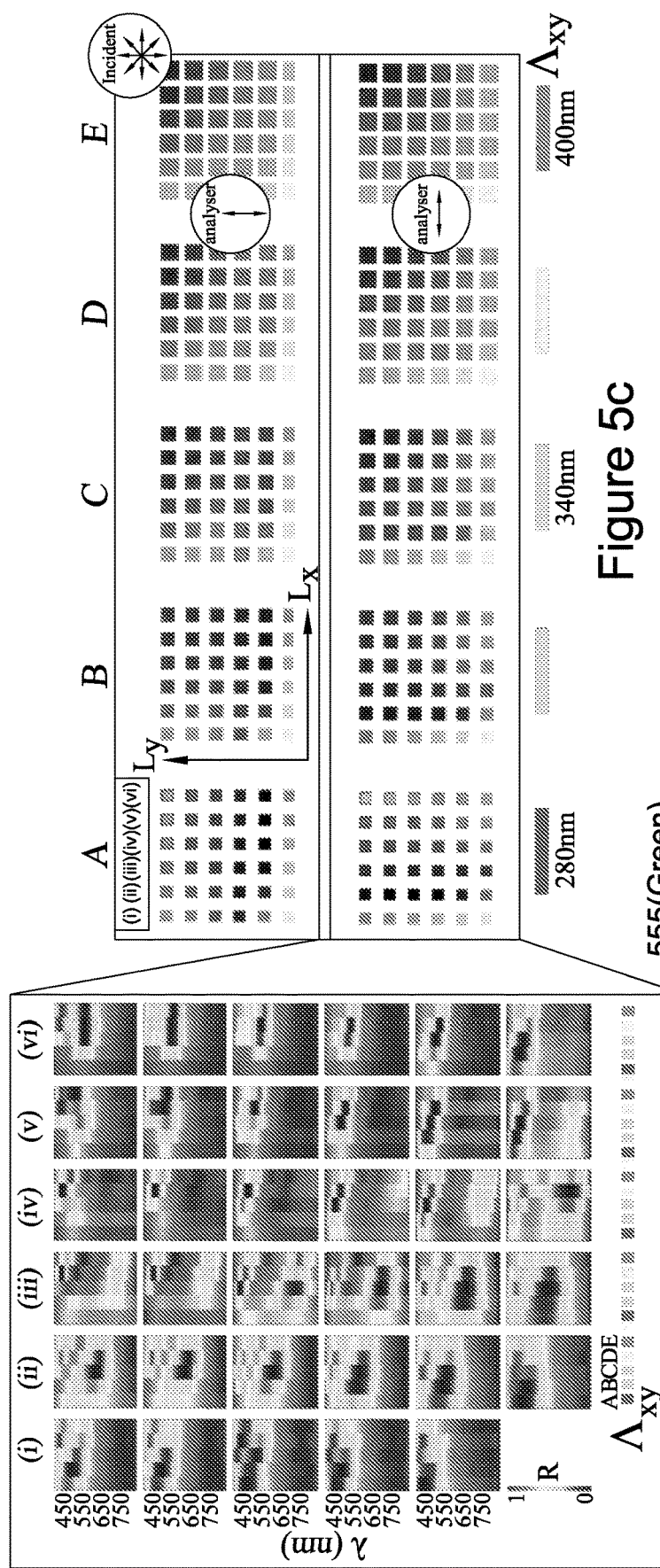
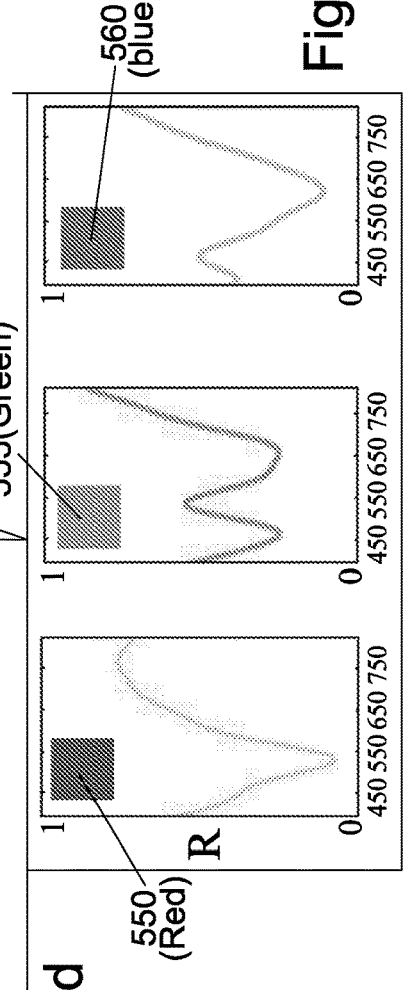
Figure 5c
Figure 5d
Figure 5e 615 610 605

*continuous MIM*

METHOD OF DEFINING AN OPTICAL FILTER ELEMENT AND OPTICAL DEVICE COMPRISING A FILTER STRUCTURE

PRIORITY CLAIM

This application is based upon and claims the right of priority under 35 U.S.C. § 371 to International Application No. PCT/GB2018/051419 filed on May 24, 2018, which claims the priority to GB Application Serial No. 1708407.0 filed May 25, 2017, each of which is incorporated by reference herein in its entirety.

FIELD OF THE INVENTION

This specification relates to optical devices, for example pixelated devices, and methods.

BACKGROUND TO THE INVENTION

Optical filter devices using a Fabry-Perot resonator structure are described in US2012/0268809. A plasmonic nanoresonator is described in U.S. Pat. No. 9,547,107. Further background can be found in U.S. Pat. No. 8,547,504; US2014/0049812; US2014/0191113; US2015/0124306; U.S. Pat. Nos. 7,705,280; 8,759,932; 9,258,536; 7,705,280; and US2016/0142654; CN106019432; US2009/067774; US2015/063748; US2011/043813; and in "Structural color printing based on plasmonic metasurfaces of perfect light absorption", Fei Cheng, Jie Gao, Ting S. Luk & Xiaodong Yang, Scientific Reports 5, Article number: 11045 (2015), doi:10.1038/srep11045.

In some applications an optical filter may be used to filter pixels, for example of a display device to provide a colour display, or of a sensor to provide a colour-sensitive sensor. However existing filters have drawbacks including lack of flexibility, optical loss, and lack of compatibility with some manufacturing processes.

SUMMARY OF THE INVENTION

This specification generally describes optical filters and devices including optical filters. The filters may be wavelength/colour selective and/or spatially selective.

For example an optical filter may be provided as a pixel filter for a Liquid Crystal on Silicon (LCOS) device, more particularly incorporated into or substituting the back reflector of such a device. Such an approach may be employed to fabricate a colour display such as a colour LCOS display.

An optical filter may also be provided as a filter for a sensor such as a pixelated sensor, for example an image sensor or other detector array selectively sensitive to light at a plurality of different wavelengths.

An optical filter may also be provided as a filter for an illumination device, more particularly to provide an illumination source to provide light at one or more different wavelengths or colours. For example the techniques described later may be employed to provide a reconfigurable illumination source.

An optical filter using the techniques described later may also be employed to spatially shape the near or far field of the filter. For example in a pixelated device the effective shape of a pixel may be changed. The shape may even be different for different colours.

In broad terms the techniques described later may be used for optical filters in general, for example to provide a bandpass filter.

In the specification light includes light outside visible wavelengths, such as infrared or ultraviolet light.

Thus in a first aspect an optical device may have a plurality of coloured pixels, each pixel comprising a filter structure. The filter structure may comprise a first metallic layer, a dielectric layer over the first metal layer, and a second metallic layer over the dielectric layer. Optionally further insulator and/or metallic layers may be added over the structure.

The second metallic layer comprises a nanostructured metallic layer to couple light incident on this layer into at least two absorption modes of the filter structure, one to either side of a target wavelength. Thus the filter structure can appear coloured at said target wavelength in reflected or transmitted light. The absorption modes may be present for unpolarised light, and for light of a specific linear polarization.

Where the metallic layer has a 2D nanostructure, for example a 2D grating or array, the two absorption modes may be associated with different polarization directions. Thus, for example, one (single) absorption mode may be associated with each of two orthogonal polarizations of the incident light.

The second metallic layer may thus have a lateral, that is in-plane structure with features having at least one characteristic lateral dimension equal to or less than 1 µm. For example the second metallic layer may be a discontinuous metallic layer defining a 1D or 2D array or grating, for example with metallic stripes or islands. Alternatively the second metallic layer may be a substantially continuous metallic layer with apertures defining stripes or islands, which may thus be a Babinet-inverted version of the metallic stripes or islands. Still further alternatively the features may be vertical features, such as ridges or bumps, defined over an optically thin layer of metal.

The features may be regular, for example defining an array, or irregular, for example comprising metallic nanoparticles, in which case the characteristic lateral dimension may be an average dimension. The characteristic lateral dimension may be scaled with wavelength. For example for infrared up to around 1500 nm the characteristic lateral dimension may be less than 1 µm and for visible, IR light at 750 nm and visible light the characteristic lateral dimension may be less than 500 nm. The features may comprise a structure (metal and/or metal aperture) having a dimension less than 600 nm (IR) or less than 300 nm (red), for example in the range 50 nm-200 nm. The features may have a periodicity of less than 1000 nm (IR) or less than 500 nm (red), for example in the range 300 nm-400 nm. Preferably the nanostructured features extend over substantially the full lateral area of the filter/pixel.

Additionally alternatively a 1D or 2D grating geometry may be characterised by a parameter $\Gamma$ which, for example, defines a duty cycle of a grating in one or each of two orthogonal, in-plane directions (x- and y-directions). Thus parameter $\Gamma$ may defines a ratio between a lateral dimension of a line/island/aperture feature and a spatial period of the features along a lateral direction. The parameter $\Gamma$ may vary from one pixel to another. In a 2D array parameter $\Gamma$ may be different in the different orthogonal directions. More generally however, in a 2D array of rectangular islands the width and spacing of the islands may each be controlled (i.e. selected) in each of the orthogonal directions.

The filter structure may have an optical response that varies with polarisation of the incident light. This can arise because the coupling into the absorption modes is polarisation-dependent. For example where the second metallic layer defines a 1D grating the filter may appear coloured at a first, coupling polarisation and substantially without colour at a second, orthogonal polarisation. In the case of a reflective structure the filter structure may appear clear or mirror-like at the second polarisation. For a 1D grating the non-coupling polarization may have the E-field parallel to the longitudinal direction of the grating (grating vector).

Where the second metallic layer defines a 1D grating this grating may have a substantially uniform geometry along a direction defined by longitudinal structures of the 1D grating. The 1D grating may be different for different pixels. For example differently coloured pixels, such as red, green and blue pixels, may have different grating geometries such that they exhibit different colours in reflected or transmitted light.

The second metallic layer may define a 2D grating comprising a 2D array of metallic islands or apertures extending over the lateral area of the filter structure, for example over each single pixel. This array, more particularly these apertures/islands, may have different geometry in different lateral directions. In this way the filter structure may exhibit a different response to orthogonal polarizations of the incident light. For example, where the second metallic layer defines a 2D grating the filter may have a first colour at a first, coupling polarisation and a second, different colour at a second, orthogonal polarisation.

For a 2D grating the apertures/islands may have a longer axis and a shorter axis in the lateral plane. When the E-field is parallel to the longer axis a single or double absorption mode or resonance (or more) may be excited. Similarly when the E-field is orthogonal to the longer axis a single or double absorption mode or resonance (or more) may be excited. For example, single-single, single-double, and double-double resonances are possible.

In some implementations the optical device may incorporate a polarizer in an optical path through the filter structure to select the optical response of a pixel by selecting a polarization of the incident light. The polarizer may be electrically or optically controllable to control the optical response of the filter structure, for example to switch the colour of a pixel on/off or to control the colour of a pixel. The controllable polarizer may comprise a layer of liquid crystal material. Thus the filter structure may be used to fabricate a controllable colour illumination source, or to control the colour of individual pixels of an image display or sensor. Here controlling colour is used to refer to controlling the presence of absence of colour as well as to changing a colour.

The at least one characteristic lateral dimension of the lateral structure may also be arranged to change across the filter structure or across a pixel to control a near- or far-field diffraction pattern of the structure/pixel. The characteristic lateral dimension may be a feature width or spacing in one or orthogonal directions. There may be a distribution of lengths of this dimension across the filter structure, effectively imposing a shape on the pixel which need not correspond to a geometric shape of the pixel. For example a square or rectangular pixel shape may be converted to a circular, oval or otherwise rounded pixel shape. The pixel shape is here an optical shape of a pixel defined by the lateral shape of an optical response of the pixel such as the pixel colour or absorption. The pixel shape may be viewed directly; it may also affect and be evident in a far-field diffraction pattern of the pixel. The pixel having a modified shape may be considered to be a "metapixel".

In the case of a 2D array of apertures/islands a length or width of the apertures/islands may vary over the area of the filter structure or across a pixel. This can be helpful for holography in reducing inter-pixel interference in a replayed image. For example a Gaussian profile may be imposed on a pixel in the x- and/or y-directions, the Fourier transform of a Gaussian being another Gaussian.

The shape of a (meta)pixel as described above may be selected and optionally dynamically controlled by controlling the polarization of incident light.

The modal profile of the excited absorption modes is typically complex and more than one mode may be excited. In some preferred implementations, however, a dominant mode of a first of the absorption modes comprises a surface plasmon mode, more particularly a surface plasmon polariton (SPP) mode. A dominant mode of a second of the absorption modes may comprise a guided mode, effectively waveguiding within the structure, which here includes Quasi Guided Modes, QGMs. However it is not essential that the dominant two modes are of this type. The absorption modes are also dependent upon geometrical parameters of the filter structure, such the thickness of the dielectric layer, and upon geometrical parameters of the features of the second metallic layer. The dielectric layer thickness may be <300 nm or <150 nm thick; using a thinner layer can reduce the number of excited modes.

The filter structure may operate in transmission or reflection. For example in transmission the first metallic layer may be optically thin. In reflection the first metallic layer is preferably optically thick, and hence reflective, for efficiency. In reflection the filter structure may substitute the reflector under an LCOS pixel. The metallic layers are typically metal layers but may comprise other materials which exhibit metallic behaviour under incident light, for example graphene or a composite material such as indium tin oxide (which are metallic for certain wavelengths).

Similarly the dielectric layer may comprise a material which exhibits insulator-like behaviour in the structure whilst not being a classical insulator. For example a phase change material may be employed which has an insulating phase and a semiconducting or conducting phase, such as vanadium dioxide which exhibits a temperature-dependent phase change.

In a related aspect there is provided a method the optical response of an optical filter element comprising an optical cavity, for example for a pixel. The cavity may comprise a first metallic layer, a dielectric layer over the first metallic layer, and a second metallic layer over the dielectric layer. It typically does not include air or a vacuum, though it may. The method comprises configuring a structure of the second metallic layer to couple light incident on the cavity simultaneously into two different resonant modes of the cavity, to absorb said incident light at two different wavelengths, one to either side of a target wavelength.

Imposing a shape on a pixel as described above need not necessarily require exciting two absorption modes.

Thus in another aspect there is provided a method of determining the optical response of a filter structure similar to the filter structure described above. The method involves configuring the second metallic layer as a 1D or 2D array of apertures/islands to couple light incident on the cavity into at least one surface plasmon resonant mode of the cavity, and varying a geometry of the 1D or 2D array over a lateral area of the filter element to vary an effective near or far field shape of the filter element.

There is also provided a method of manufacturing an optical device including an optical filter element with an optical response defined according these methods.

Devices and methods of this type provide increased flexibility, providing many parameters for engineering a filter/pixel structure. This in turn facilitates optimisation for particular applications. An optical device incorporating the filter structure can also provide one or more of an increased colour gamut, a reduced insertion loss, and improved compatibility with device manufacturing processes. The structures are readily integratable with liquid crystal devices such as display devices, and they may also be integrated with an array or imaging sensor, for example a CMOS sensing device. They can also be used to provide an improved illumination source, in particular a multicolour and/or pixelated illumination source. Such an illumination source can have applications in many fields, for example in endoscopes, borescopes and related internal imaging devices. The filter structure can be reconfigurable by changing the polarization of incident light, for example under electrical control, for example to change a colour response of the structure. Thus, the structures can provide a reconfigurable/controllable display, sensor, or illumination source. The ability to control the optical shape of a pixel can also facilitate improved holographic devices, such as holographic display devices.

BRIEF DESCRIPTION OF THE DRAWINGS

These and other aspects of the invention will now be further described, by way of example only, with reference to the accompanying figures in which:

FIG. 5(c) shows experimental optical characterization results of a range of pixels exhibiting vivid colours under varying polarization conditions.

FIG. 5(d) shows reflectivity map of a range of pixels exhibiting vivid colours.

FIG. 5(e) shows selected pixels exhibiting RGB behaviour.

DETAILED DESCRIPTION OF PREFERRED EMBODIMENTS

This specification describes a nanostructured plasmonic metal-insulator-metal (MIM) pixel that utilises multimodal absorption. Advantageously, examples of the described MIM pixels can offer near-perfect reflection for the target colour, wide wavelength selectivity, polarization switchable sub-pixel optical properties and compatibility with industrial manufacturing techniques. The MIM pixels can be deployed in high resolution microdisplays.

By combining plasmonic nanostructures with MIM geometries, multiple modes can be simultaneously excited in order to tailor the optical properties of a reflector. A reflective pixel design based on plasmonic nanostructure MIM geometries, and which offers highly reflective, polarization dependent, colour filtering in the visible spectrum (400-700 nm) has been demonstrated. The devices suppress unwanted colours to either side of the target wavelength through a combination of absorptive surface plasmon (SP) and plasmonic waveguiding modes (guided mode resonance). Due to the MIM geometry and mirror-like reflection for the target wavelength, unwanted wavelengths are strongly absorbed. In addition, 1D, 2D and nanostructure arrays allow for the coupling of only certain polarization states and wavelengths to the absorption modes. This concept was extended to create more advanced pixels which incorporate in-plane 2D amplitude functions on the pixel itself, encoded with nanostructures. Gaussian-profile plasmonic pixels were used for the spatial tailoring of the colour properties on a sub-pixel basis. In the new pixel design, pixels are need not be just rectangular and each pixel may have polarization controlled colour spatial functions. This is ideal for the integration with liquid crystals (switchable waveplates). This represents a departure from the conventional paradigm of using square pixels that only encode amplitude.

Figure 1A:
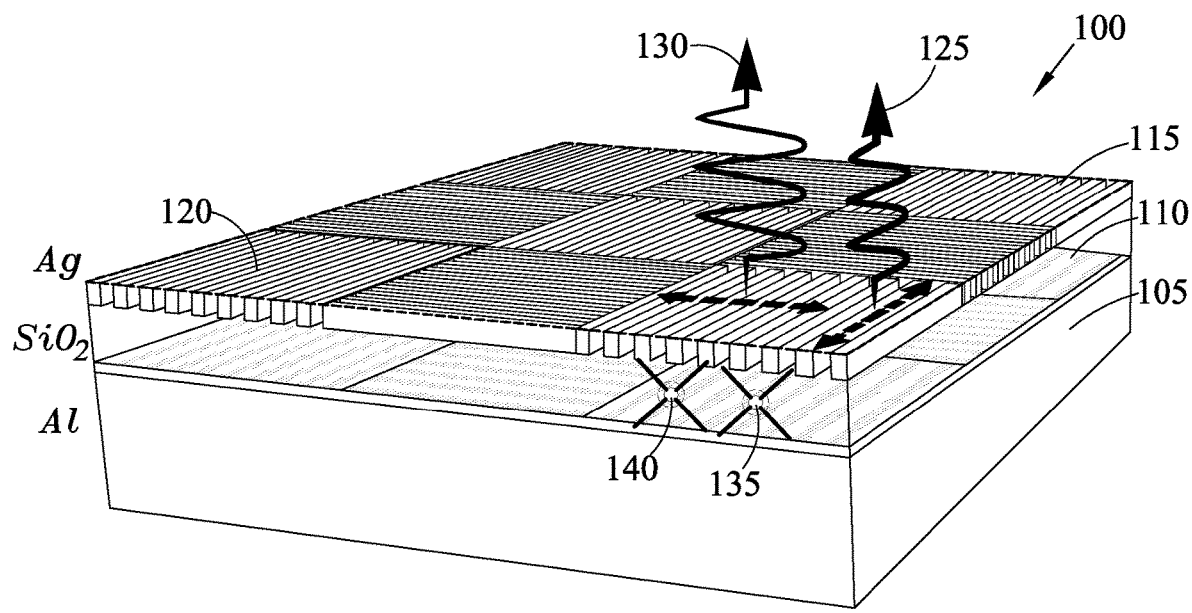
FIG. 1(a) illustrates an example of an optical device showing pixels with 1D gratings.

FIG. 1a shows an example of an optical device 100 having a respective plurality of coloured pixels 120. Each colour pixel comprises a first metallic layer 105, dielectric layer 110 and second metallic layer 115. The second metallic layer comprises a 1D grating structure. The wavelength signals indicated with reference numerals 125 (purple) and 130 (green) are reflected wavelengths. The wavelengths signal indicated by reference numerals 135 (red) and 140 (blue) are absorbed wavelengths.

Figure 1B:
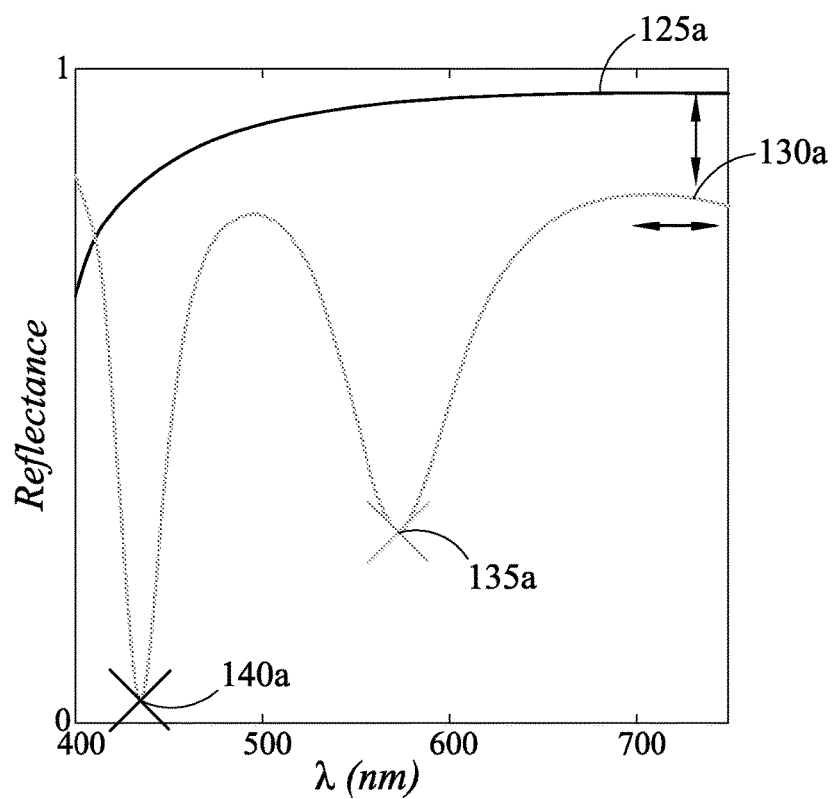
FIG. 1(b) shows simulated reflection spectra of the optical device having pixels with 1D grating with two different polarisations of the incident light.

FIG. 1b shows simulated reflection spectra for two different polarisations indicated by reference numerals 125a (purple) and 130a (green). For the first polarisation (125a), there is no strong absorption in the wavelength range. For the second polarisation (130a) there are two absorption wavelengths, one to either side of a target wavelength. The two absorption wavelengths are indicated by 135a, 140a on FIG. 1b. The first polarisation corresponds to a 'green signal' (130) and second polarisation corresponds to a 'blue signal' (125) in FIG. 1a.

The origin of the two absorptions is described later; they have different underlying physical mechanisms. In an example described later one is SP (Surface Plasmon) mode and the other is QGM (Quasi Guided Mode) mode. Selection of the absorption wavelengths is described in more detail later.

Figure 2A:
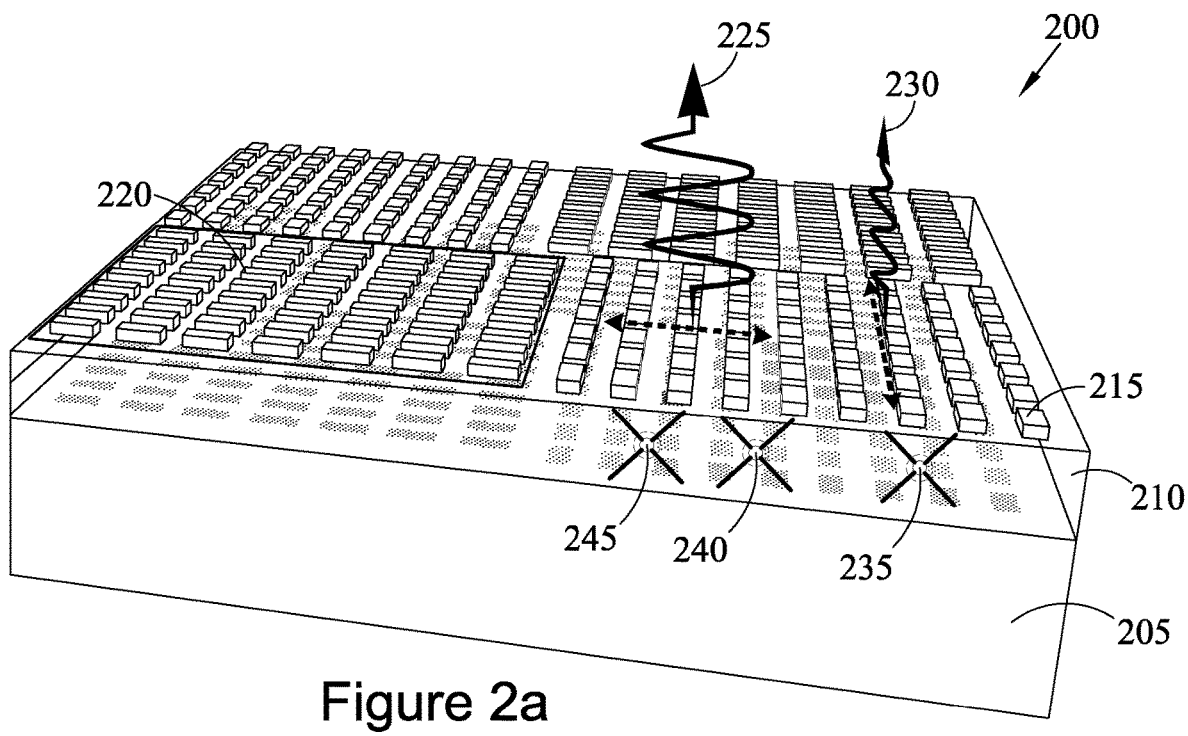
FIG. 2(a) illustrates an example of an optical device showing pixels with 2D nanostructures.

Referring to FIG. 2a, which shows a second example of optical device 200 having a respective plurality of coloured pixels 220. Each colour pixel comprises a first metallic layer 205, dielectric layer 210 and second metallic layer 215. The second metallic layer comprises 2D grating structure. The wavelength signal indicated with reference numerals 225 (blue) and 230 (red) are reflected wavelengths. On the other hand, wavelengths signals indicated by reference numerals 235 (green), 240 (red) and 245 (turquoise) are absorbed.

Figure 2B:
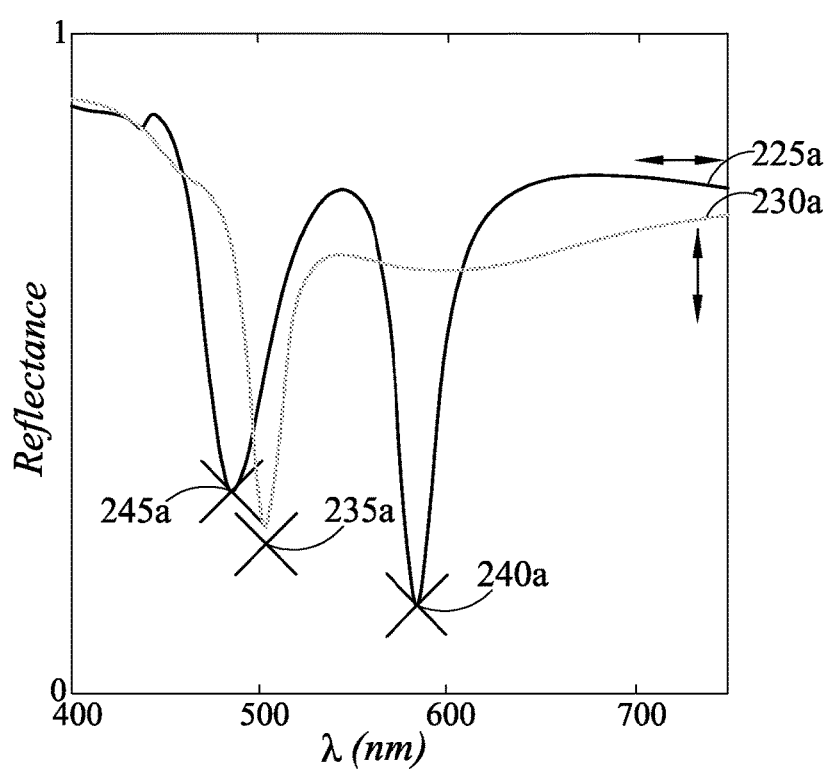
FIG. 2(b) shows simulated reflection spectra of the optical device having pixels with 2D nanostructures with two different polarisations of the incident light.

FIG. 2b shows simulated reflection spectra for two different polarisations indicated by reference numerals 225a (blue) and 230a (red). For the first polarisation (225a), there is one absorption peak in the wavelength range. For the second polarisation (130a) there are 2 absorption wavelengths one to either side of a target wavelength. The absorption wavelengths are indicated by 235a, 240a and 245a on FIG. 2b. The first polarisation corresponds to 'red signal' (230) and second polarisation corresponds to 'blue signal' (225) in FIG. 1a.

Examples of the materials used in the optical devices described are as follows. Aluminium (Al) is a good reflector hence may be used as a first metallic layer. Silver (Ag) is good for plasmons and may be used as a second metal layer comprising the nanostructures. SiO2 is easy to process by standard techniques and may be used as an insulator. In one example layer thicknesses of Ag(30 nm)-SiO2(100 nm)-Al (100 nm)-Si(bulk) were employed, which achieved specific colour properties. It will be appreciated that that any other combination of metal and insulators may be used.

The optical devices with MIM pixels may be integrated with LCoS pixel technology, which includes multiple polarizers and incorporates pigment-based colour filters for spectral filtering. By varying periodicity, grating widths and designs, a range of polarization dependent plasmonic MIM colour pixels are produced which utilize the existing Al reflectors as the back-reflector in a typical MIM-pixel backplane. The MIM pixels can eliminate the need for additional polarizers and pigment-based colour filters on the display backplane, and add additional functionality through polarization-spectral control and in-plane pixel colour functions. Moreover, the dimensions and materials utilized means the designs are highly compatible with a range of methods for larger scale manufacturing, including extreme-UV photolithography and nanoimprint lithography.

Prior art systems utilise a reflective LCoS microdisplay which contains typical RGB-filter pixel array reflectors. In the RGB-filter array, each pixel is relatively large in size and pigment-based filters control colour/wavelength and hence each pixel can only exhibit one colour.

In comparison to a conventional LCoS microdisplay, plasmonic MIM pixels, utilize resonant phenomena to form their unique optical response. The designs of the MIM pixels are based on nanostructuring the available reflector area. For each target wavelength, a minimum of two absorption modes are tailored to sit either side of the target wavelength thus eliminating the requirement for RGB filters. The MIM pixel designs shown in FIGS. 1(a) and 2(a) can include multiple states and multiple colour functionality, yet offer high reflection due to the MIM geometry.

Through nanostructured periodicity, 1D or 2D as discussed above, providing an additional in-plane momentum component, surface plasmons (SPs) can be excited at normal incidence: both propagating surface plasmons (PSPs) or localised surface plasmons (LSPs), depending on the geometry. Anisotropic geometry enables polarization dependency, and shrinking features to sub-wavelength size, leads to colour filtering. Integration into MIM geometry results in the plasmonic quasi-guided modes (QGMs) and cavity modes (CMs) being excited. For the former, the structure acts as a plasmonic waveguide for wave propagation tangential to the interface. Hence, the MIM pixels may have optical functionality (colour, polarization, amplitude, in-plane functions) encoded with nanostructures (or sub-pixels) on the pixel reflector itself. To excite a waveguide mode, top-layer periodicity (nanostructuring) is utilized—analogous to an out-of-plane grating coupler. The nanostructured top-layer grating scatters light into multiple modes, with varying wave-vector components. It is then possible to couple these diffracted modes into waveguide modes, albeit leaky, which propagate tangential to normal incidence. Moreover, depending on insulator thickness, plasmonic and/or oscillatory (conventional) waveguiding modes can be excited. The former has tangential E-fields confined to the interface. In addition, as the number of possible excitation modes increases, resonant-modes overlap and are simultaneously excited, and hybridization occurs. The modes in the devices may consist of hybridized forms of SP modes, CMs and QGMs (plasmonic).

MIM Grating Pixels

Figure 3A:
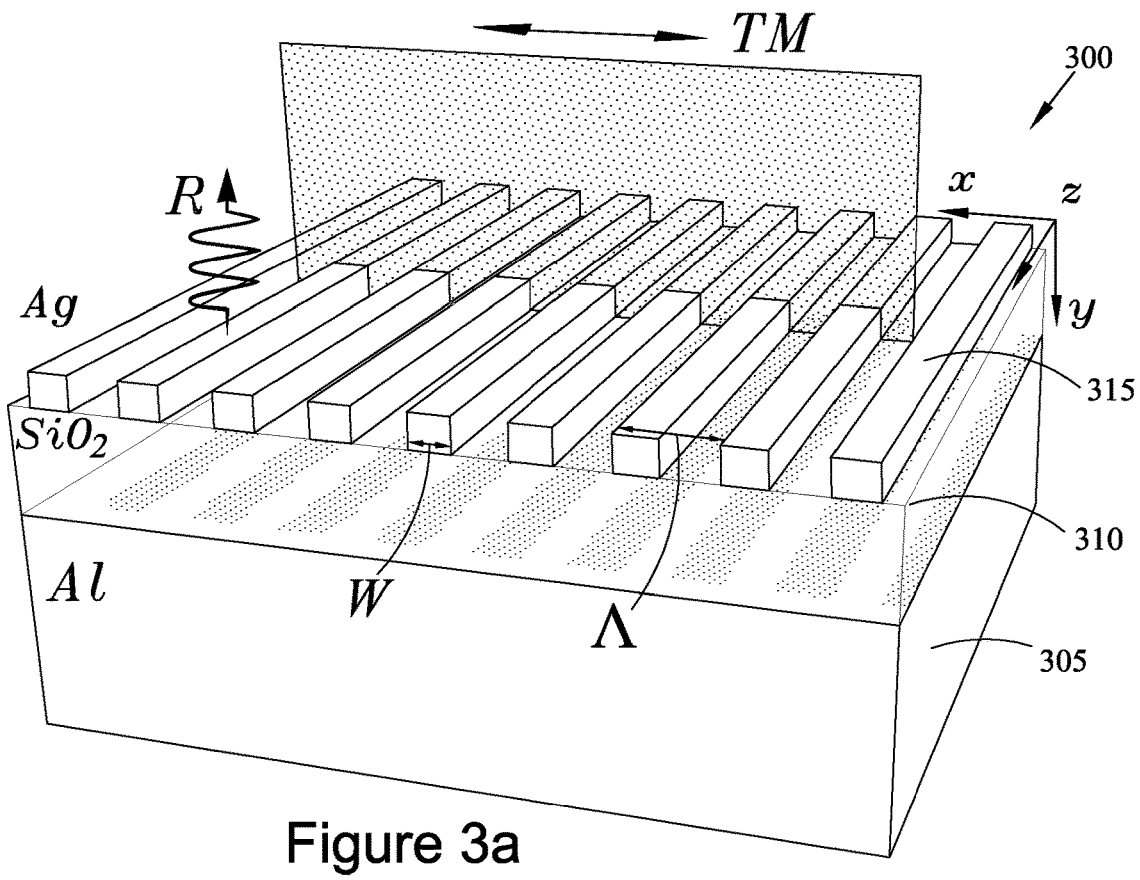
FIG. 3(a) shows a pixel design with 1D grating indicating the grating width and the grating period.

In another example, ultra-thin (e.g. 30 nm) plasmonic 1D gratings with MIM geometry are implemented. FIG. 3(a) shows a schematic of a 1D MIM grating with common grating parameters defined: varying grating widths, $W_g$ (nm), and grating period, $\Lambda$ (nm), with duty cycle, $\Gamma=W_g/\Lambda$. An MIM pixel 300 comprises a first metallic layer 305, a dielectric layer 310 and a second metallic layer 315 comprising a 1D grating. The pixels are patterned using electron-beam lithography (EBL), the back-reflector is made from sputtered Al (e.g. 100 nm), the insulator is reactively sputtered $SiO_2$ (100 nm) and the nanostructured top-layer is thermally evaporated Ag (e.g. 30 nm). The parameters of the pixel are chosen to optimize for dual-resonant (SPP and QGM) operation within visible wavelengths. The insulator thickness may be set such that only the fundamental plasmonic waveguiding mode (QGM) can exist, and an Ag top-layer may be used for optimal SPP excitation behaviour.

Figure 3B:
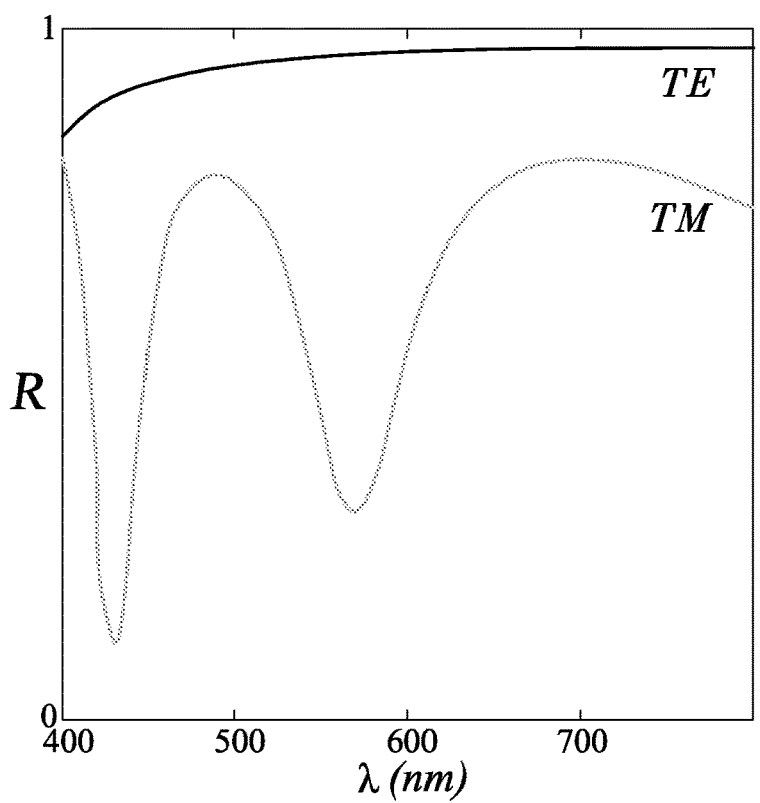
FIG. 3(b) shows simulated reflection spectra of the pixel with 1D grating with two different polarisations of the incident light.

Each 1D reflector pixel as shown in FIG. 3(a), exhibits a minimum of two resonances: the first, is a SP-mode and the second is a QGM. FIG. 3(b) shows the reflection response of a nanostructured MIM-grating ($W_g=120$ nm, $\Lambda=400$ nm, $\Gamma=0.3$) for TM-polarization from full-wave FDTD (Finite Difference Time Domain) simulations. The two absorption modes are shown in FIG. 3b. The shorter wavelength mode (~427 nm) is close to the fundamental vertical cavity mode (CM) and exhibits SPP, CM and QGM field-profile characteristics. The longer wavelength mode (~575 nm) exhibits SPP (Ag—SiO2) and QGM characteristics. The modal dispersion is such that the grating width and duty cycle variation leads to stronger or weaker coupling into the associated system modes.

Figure 3C:
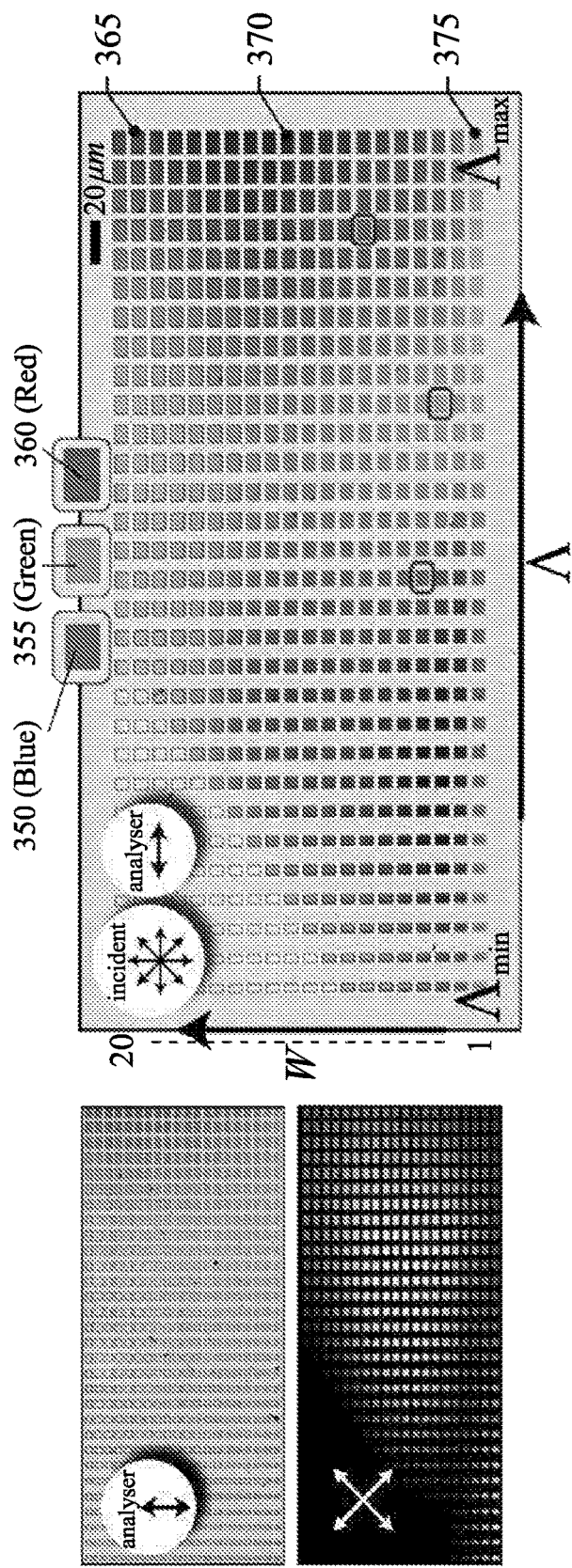
FIG. 3(c) shows optical characterization results of a range of pixels exhibiting vivid colours under varying polarization conditions with varying grating width and grating period.
Figure 3D:
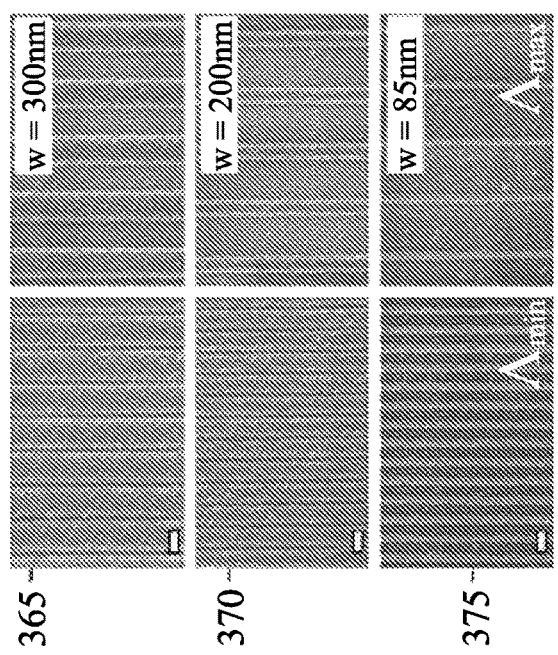
FIG. 3(d) shows SEM images of the minimum and maximum grating periods for a range of grating widths.
Figure 3E:
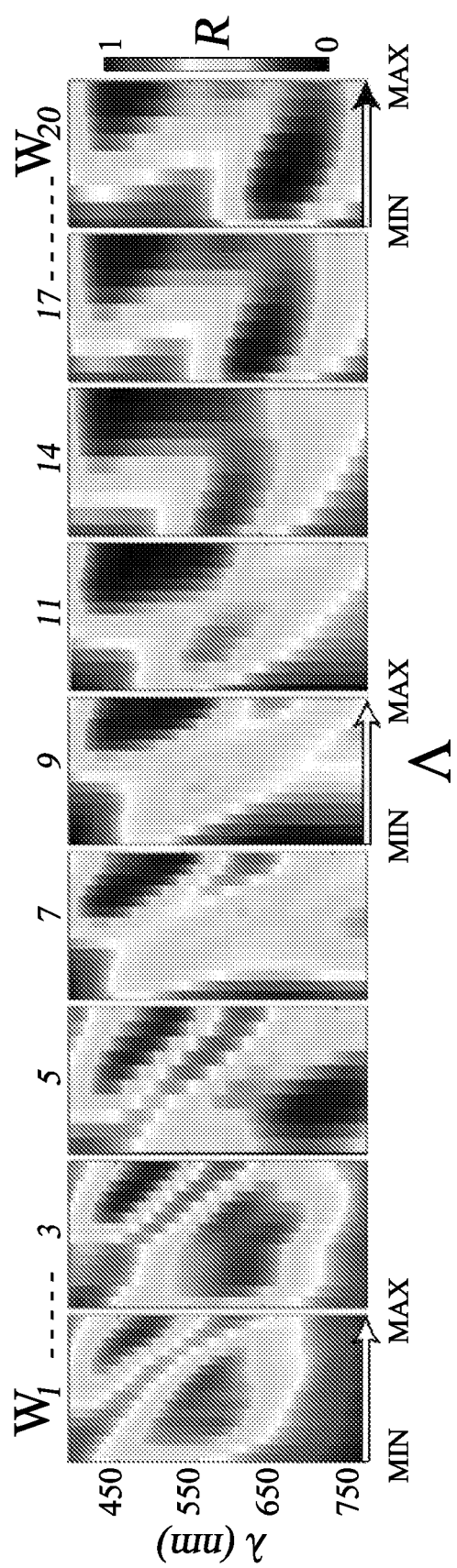
FIG. 3(e) shows experimental reflection measurements of wavelength λ vs grating period Λ [which varies in the x-axis in FIG. 3(c)] of different pixel rows (1-20).

In this example, each grating is 10 μm in length but with variation in total width. The designed grating width varies from ~80-310 nm and grating unit cell varies from ~180-600 nm. SEM images of the smallest and largest spacing pixels are shown in FIG. 3(d). For polarized incident light and analyzer aligned with TM-polarization (parallel to grating vector), a range of vivid colours in reflection are observed FIG. 3(c). The surrounding white part of this image is ~100% reflection from the Al-back reflector. By varying the analyzer rotation the arrays transition from conventional reflector pixels to plasmonic-enhanced pixels, shown in FIG. 3(c). At a large grating period (low duty cycle), resonant spectra are observed. The three insets in FIG. 3(c) are zoomed in versions of selected RGB colours in the larger array. FIG. 3(e) presents the experimental reflection spectra ($\lambda$ vs. $\Lambda$) of a selection of the rows (labelled 1-20) as a function of duty cycle.

For all spectra, at least two modes are observed, which decrease in resonant wavelength as duty cycle increases (spacing decreases). In the spectra with narrowest grating widths, i.e. up to ~85-175 nm [FIG. 3(e)—sub-FIGS. 1-7] strong, sharp, reflection peaks are obtainable in the visible part of the spectrum (~400-650 nm) with absorption modes either side. The reflection is normalized to a reference mirror, and due to the MIM-geometry, efficiencies are high.

Figure 4A:
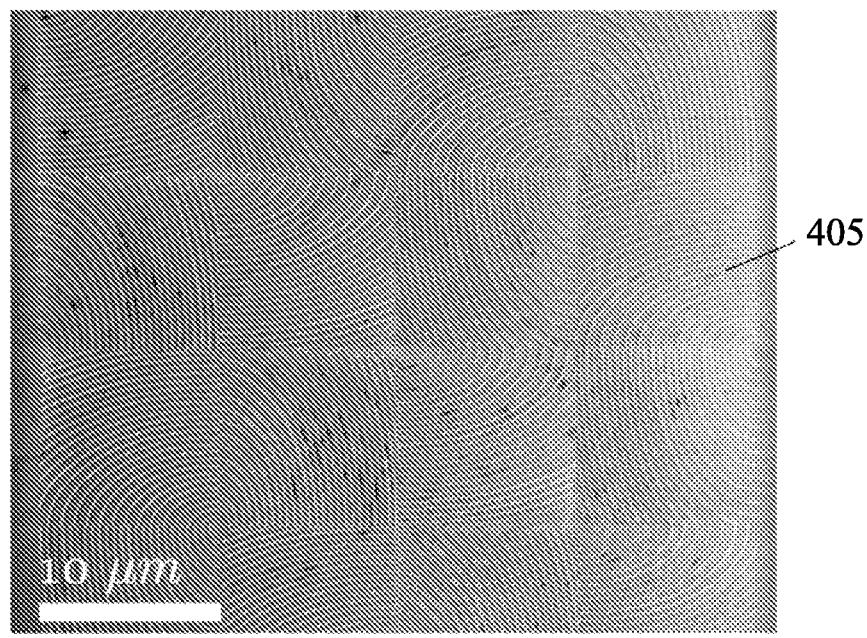
FIG. 4(a) shows an example of SEM image of RGB plasmonic pixels with gradient spacing spirals.
Figure 4B:
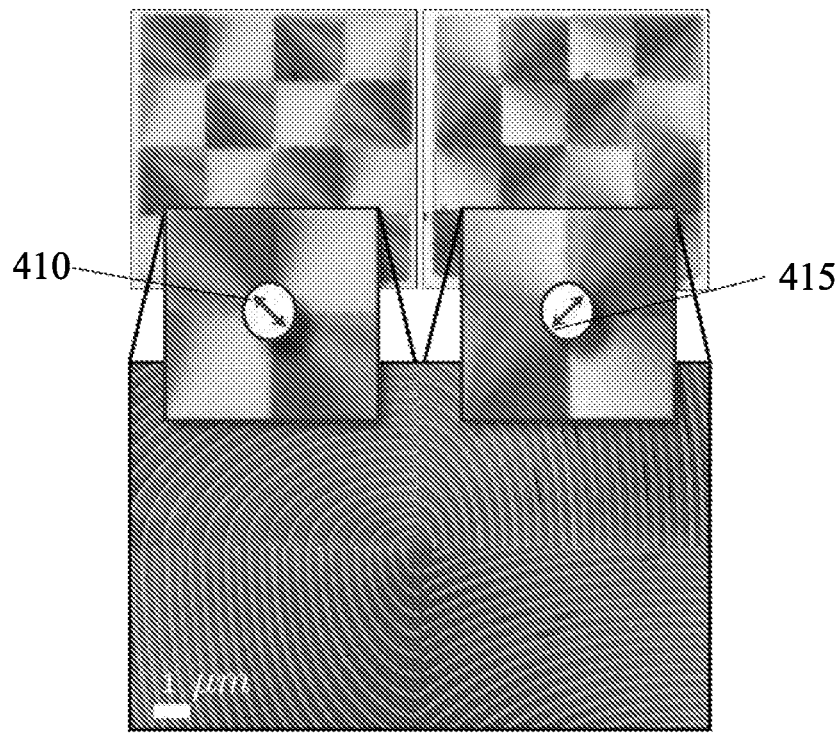
FIG. 4(b) shows an example of SEM and optical images of RGB plasmonic pixel with gradient spacing spirals under two orthogonal polarizations conditions for the analyser.
Figure 4C:
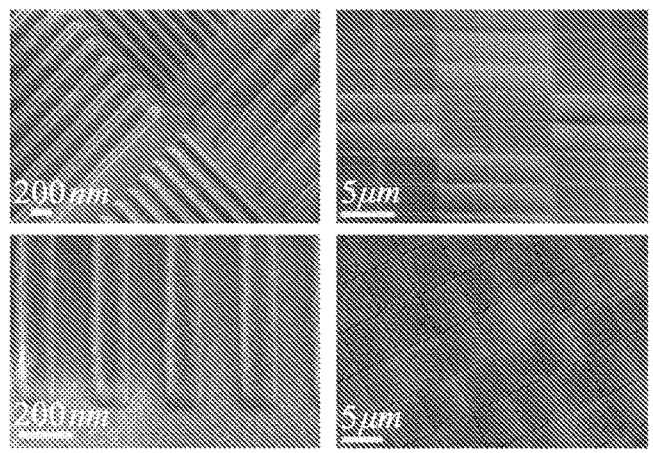
FIG. 4(c) shows SEM images of different RGB pixel designs.
Figure 4D:
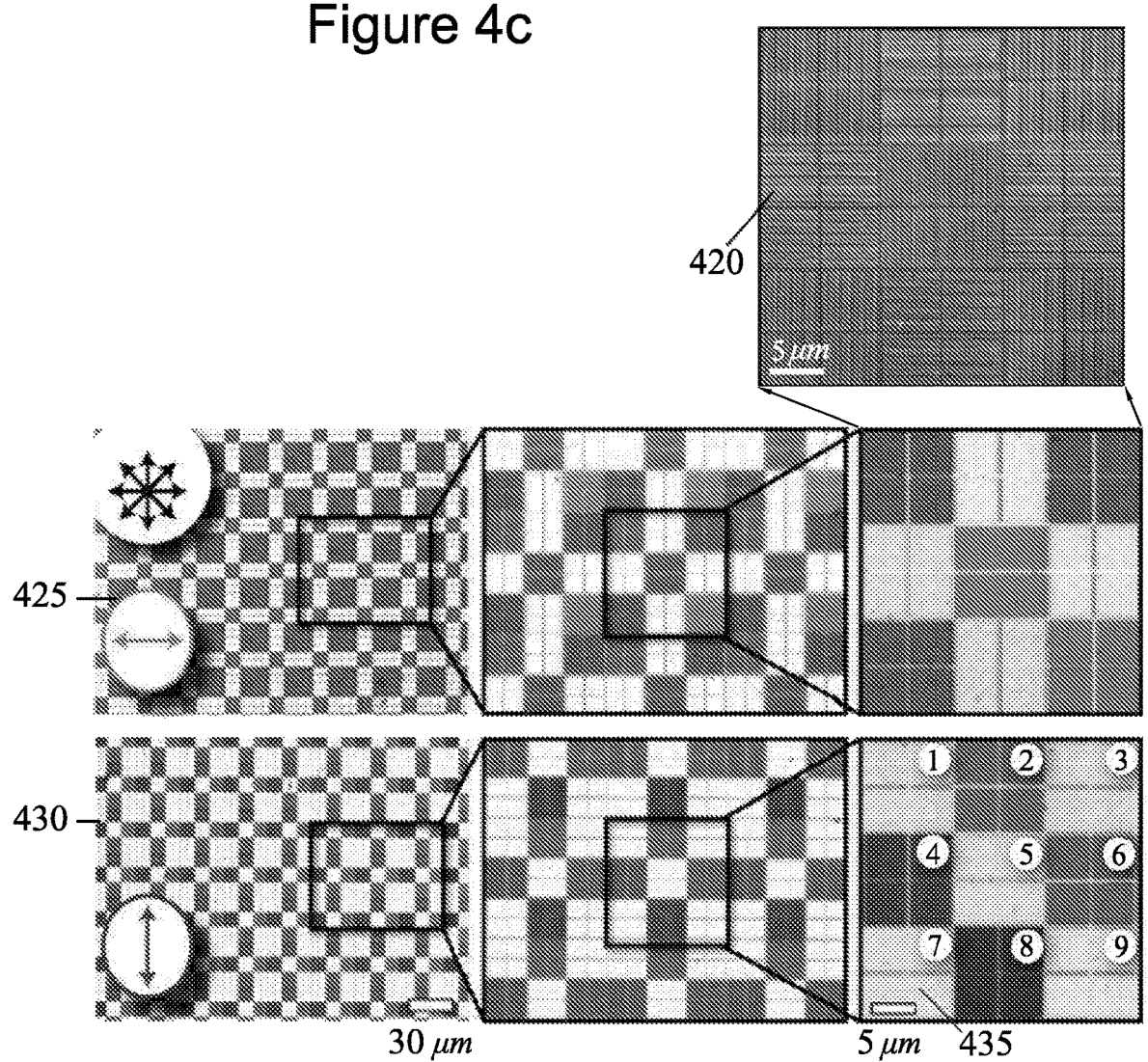
FIG. 4(d) shows optical characterization of an array of plasmonic pixels exhibiting RGB colours under varying polarization conditions.
Figure 4E:
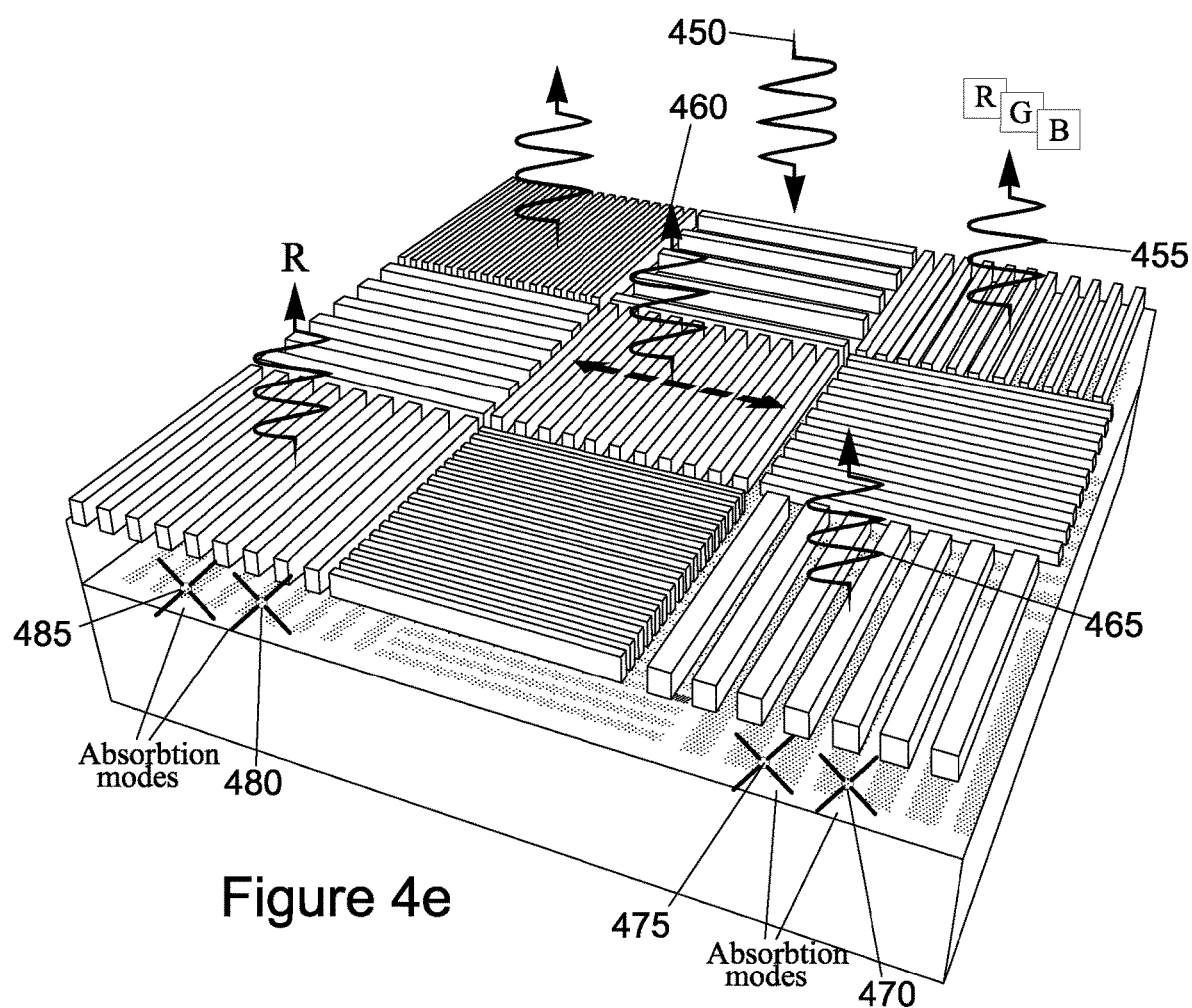
FIG. 4(e) shows a schematic diagram of an RGB pixel design.
Figure 4F:
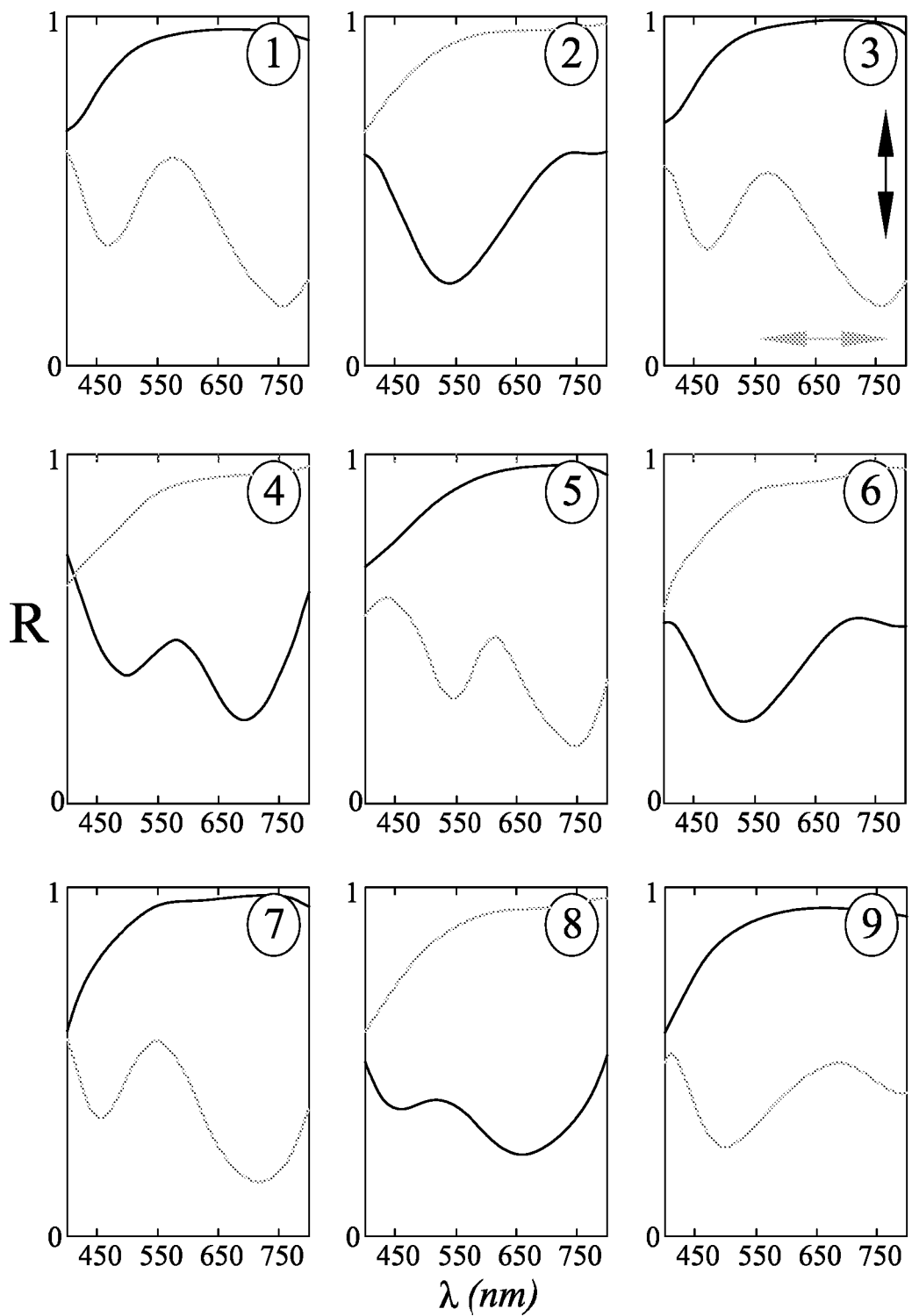
FIG. 4(f) shows reflection measurements of a unit cell [indicated with reference numeral 435 in FIG. 4(d)] with orthogonal polarization conditions.

By selecting the widths and gratings which correspond to RGB colour profiles, sub-pixel arrays are created which act as polarization selective colour pixel reflectors as schematically shown in FIG. 4(e). FIG. 4(a) and FIG. 4(b) show gradient spacing spirals (the grating spacing changes when traversing around a spiral) under SEM and optical microscope under two orthogonal polarizations (410, 415) conditions for the analyzer. These show bright colour gradients from blue-to-red, which can be varied/switched with analyzer rotation. Based on this, an example of the main RGB plasmonic-MIM pixel array concept may be created as shown in FIGS. 4(c) to 4(f), which is based on a typical Bayer color filter mosaic. Under incoherent, unpolarised illumination, orthogonal analyzer polarizations result in either broadband reflection or plasmonic colour selection as shown in FIGS. 4(d) and 4(f). For the latter, each sub-pixel exhibits absorption modes either side of their respective colour as shown in the reflectance spectra in FIG. 4(f). With TE-mode selected (analyzer parallel to grating-vector), the reflectance tends to that of thin-film silver. For plasmonic colour selection, due to high reflectance of the target wavelength from the back-reflector, the reflectance tends to that of perfect linearly polarized light reflection i.e. 50%.

Figure 5A:
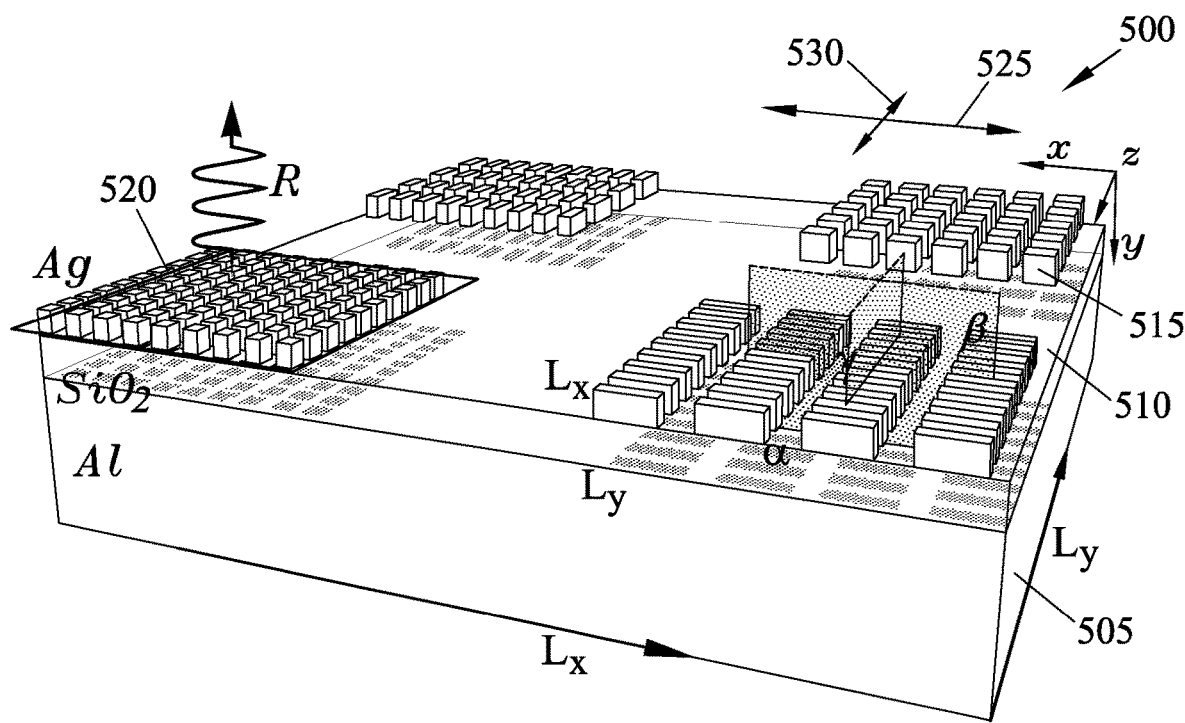
FIG. 5(a) illustrates an example of an optical device showing pixels with 2D nanostructures with symmetric grating period in x and y direction

2D Plasmonic MIM Pixels 2D nanostructured-MIM-pixel-arrays allow for additional degrees-of-freedom for polarization and spectral control, instead of just colour or mirror-like reflection, as described previously. Moreover, in comparison to a conventional RGB-filter pixel array, a MIM pixel has the ability to exhibit more than just one colour. FIG. 5(a) shows a schematic of nanostructured MIM plasmonic structures, with the nanostructure dimension in the x-dimension, $L_x$, and y-dimension $L_y$, with symmetric grating period, $\Lambda_{xy}$. $\alpha$ is the x-z plane intersection, $\beta$ the x-y plane and $\gamma$ the z-y plane. The total area for each sub-array is comparable to high-resolution reflective microdisplay pixels. However, colour is generated without pigment, and there is an amplitude response without the conventionally required incident polarization state. The anisotropic nature of a MIM nanostructure leads to either dual-resonance behaviour (orthogonal E-field to the long-axis) or single resonance (parallel E-field to the long-axis). Both SPP and QGM behaviour modes can be identified, which are dependent on unit cell periodicity in 2D and nanostructure geometry. The reflection response of a typical 2D plasmonic MIM pixel with two resonant absorption modes is shown FIG. 5 (b).

Figure 5B:
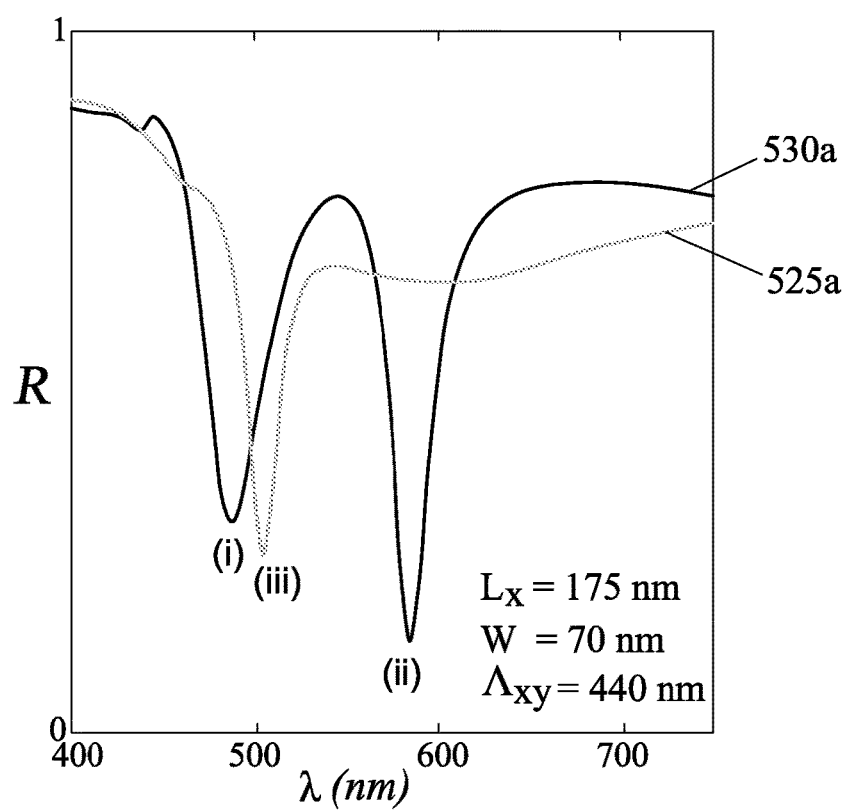
FIG. 5(b) shows simulated reflection spectra of a 2D plasmonic MIM pixel with two resonant absorption modes.
Figure 5F:
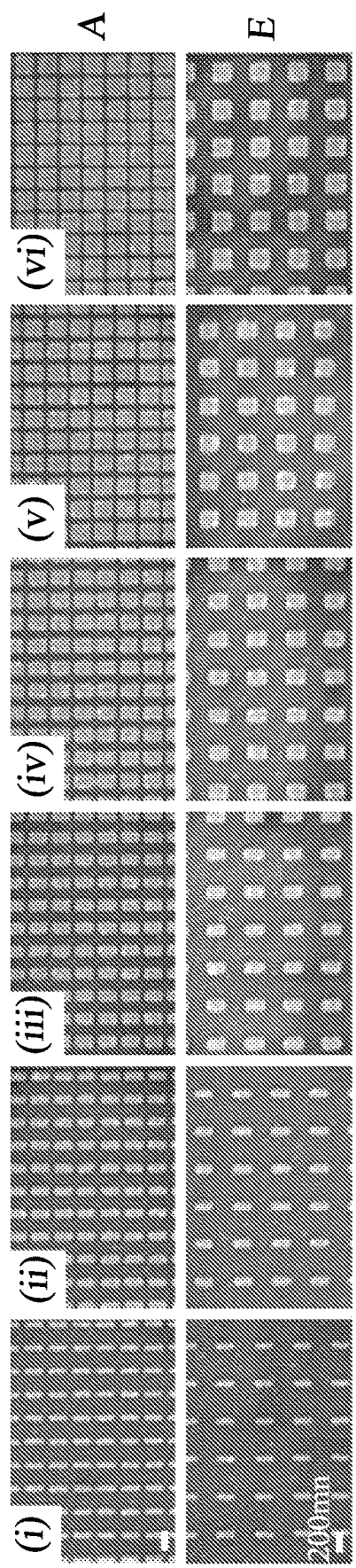
FIG. 5(f) shows SEM images showing the extremes of the range of different arrays; from smallest-to-largest grating period (A-E) and smallest-to-largest $L_x$ parameter.

FIGS. 5 (c) and 5(d) shows the experimental results of the plasmonic MIM pixel arrays, with SEM images of selected pixels shown in FIG. 5(f). These example nanostructure arrays have dimensions ranging from ~75-250 nm in both the x-dimension ($L_x$) and y-dimension ($L_y$), with a symmetric grating period (i.e. $\Lambda_x=\Lambda_y\rightarrow\Lambda_{xy}$) ranging from ~280-400 nm. In FIG. 5(c), under unpolarized incident light, the variation in analyzer rotation reveals the polarization dependent spectral filtering properties. A range of vivid colours across the visible are observed, which for orthogonal polarization conditions are symmetric about $L_x=L_y$, as shown through the colour symmetry in the optical images in FIG. 5(c). Hence, the reflectivity map in FIG. 5(d) is transposed upon orthogonal analyzer conditions, resulting in polarization-specific colour properties. The optical properties are characterized through the reflectance spectra in FIG. 5(d) in which the spectra is recorded with the analyzer aligned with Lx. Each plot in FIG. 5(d) represents one of the pixels in the 6×6 array (with $L_x$ and $L_y$ variations), and each plot consists of 5 sub-plots representing the symmetrical unit-cell spacing variations. Hence, within each 6×6 array, anisotropy (aspect ratio) is increased in both x and y, and each 6×6 array [out of 5, A-E as shown in FIG. 5(c)] representing a different unit-cell spacing.

The results in FIG. 5 (d) show that it is possible to achieve both dual and single resonances in order to tailor the reflection spectra across the visible part of the spectrum. As the grating period, $\Lambda_{xy}$, increases (A-E) as shown in FIG. 5(c), the resonant modes increase in wavelength, and in combination with increasing anisotropy, eventually splitting into multiple modes arising from the plasmonic MIM structure. It can be observed from FIG. 5(c) left-to-right, that there are two short wavelength modes to begin with (i), which slowly separate (ii-ii), then transition into a single mode (v-vi), which then eventually begins to split. Due to the spectral position of the shorter wavelength mode, which increases in wavelength as the spacing increases, this can be considered the grating-coupled SPP mode. The longer wavelength mode, which increases in wavelength as the spacing increases, is a hybrid SPP-QGM. A wide colour gamut is readily available by selecting various geometries i.e. based on the spectra in FIG. 5(d) and it is possible to generate a wide range of colours in reflection. Hence, in FIG. 5(e) three arrays are selected to indicate RGB colour properties with red, green and blue pixels indicated as 550, 555 and 560 respectively. FIG. 5(f) shows SEM images showing the extremes of the range of different arrays; from smallest-to-largest grating period [A-E as shown in FIG. 5(c)] and smallest-to-largest $L_x$ parameter.

Plasmonic MIM Gaussian Pixels (Examples of "Metapixels")

Figure 6A:
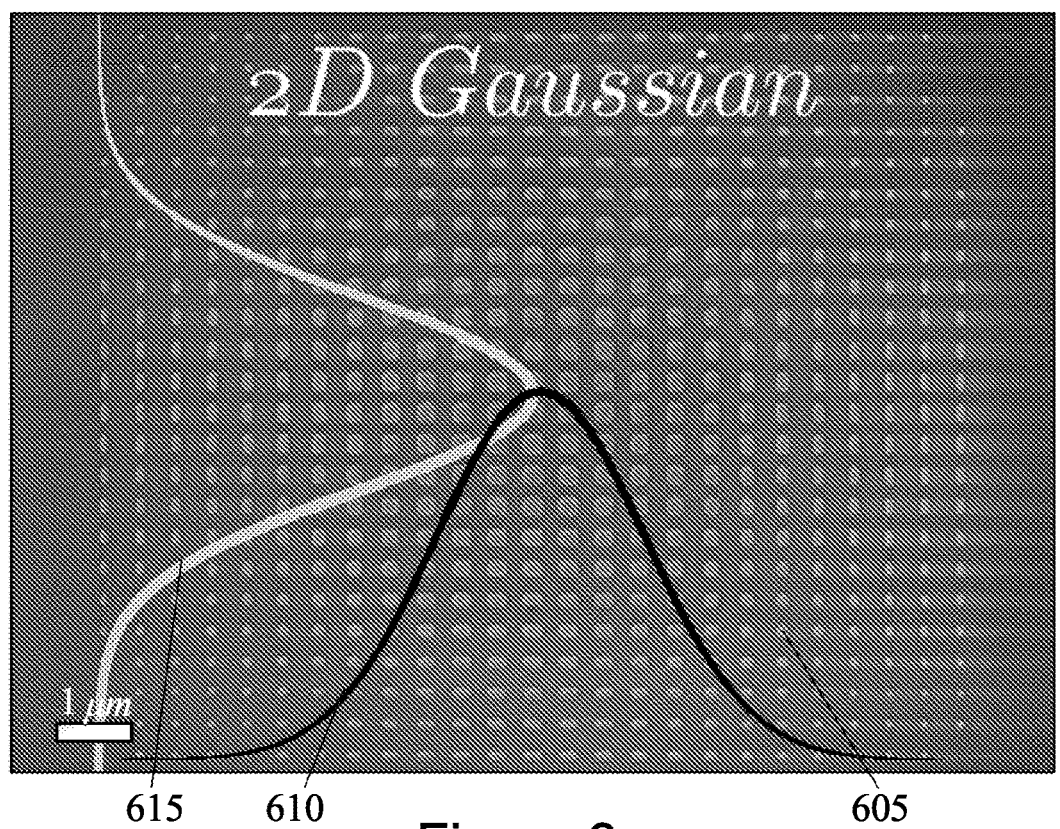
FIG. 6(a) shows an SEM image of 2D Gaussian nanostructured pixels, with the overlaid Gaussian functions in the x/y directions.
Figure 6B:
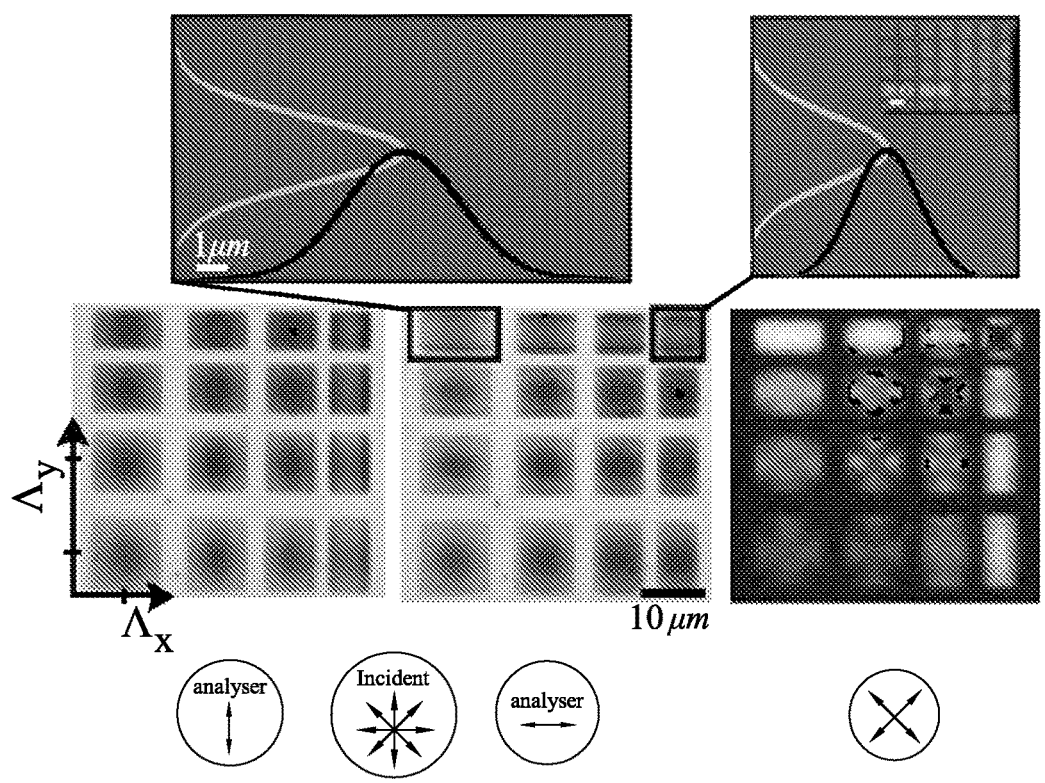
FIG. 6(b) shows optical images of 2D Gaussian nanostructured pixels together with their associated SEM images, with overlaid Gaussian functions in the x/y directions; the optical images are with two orthogonal analyzer conditions and a crossed-polarization state, showing gradient colour functions associated with each pixel.
Figure 6C:
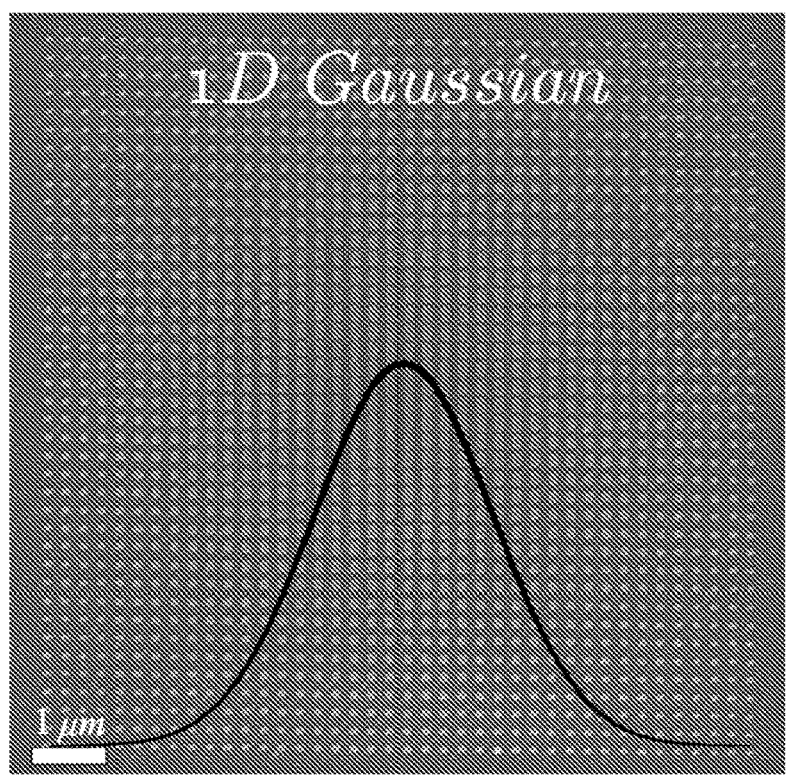
FIG. 6(c) shows an SEM image of 1D Gaussian nanostructured pixels, with an overlaid Gaussian function in the x direction.
Figure 6D:
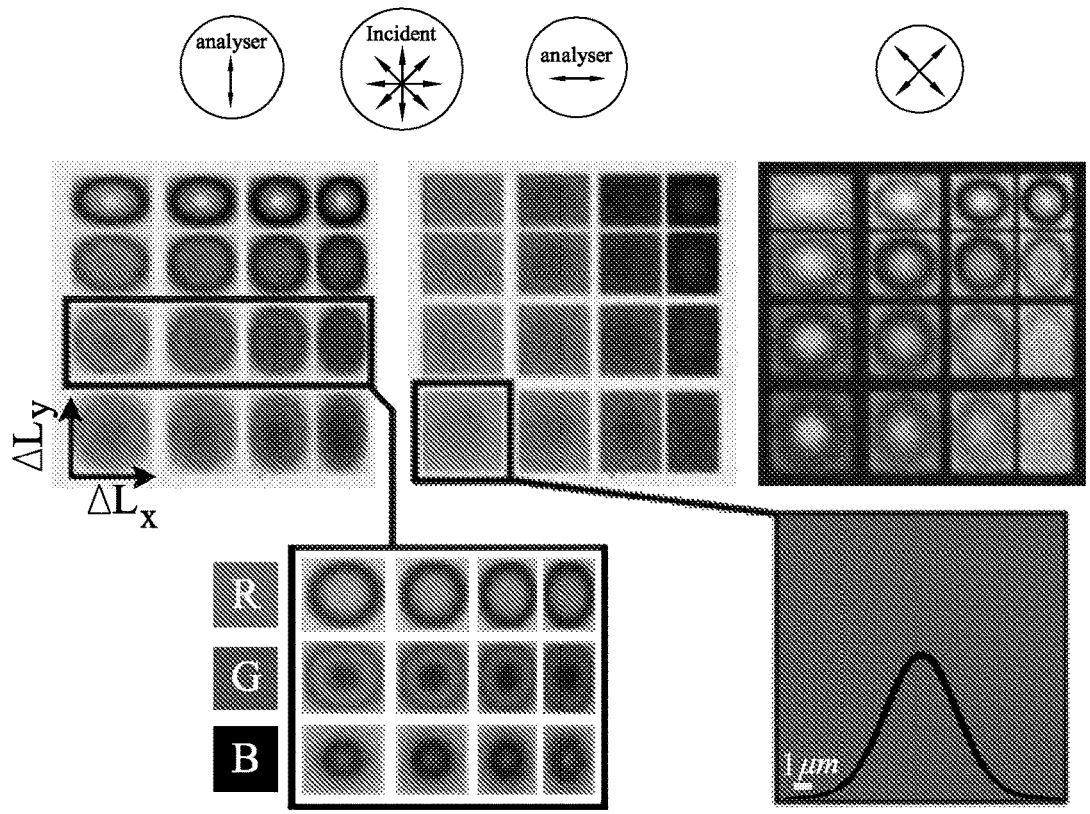
FIG. 6(d) shows optical images of 1D Gaussian nanostructured pixels together with their associated SEM images, with the overlaid Gaussian functions in the x direction; the optical images are with two orthogonal analyzer conditions and a crossed-polarization state, showing gradient colour functions associated with each pixel and the inset shows the RGB channels of one of the Gaussian rows showing how each pixel encodes varying responses depending on the wavelength.

The polarization-dependent, high reflectance, spectral control from the nanostructured plasmonic pixel allows innovative pixel designs, which we here term metapixels. For example, a rectangular form-factor may not be optimal for information discretization and display. In the graded pixels described, the in-plane shape and/or colour can be polarization controlled. In one example, in-plane Gaussian profile pixels, as shown in FIG. 6a are used. One or more dimensions of each nanostructure are controlled in 1D or 2D, for example according to a Gaussian function. The pixel colour function may therefore be non-uniform and/or the pixel shape non-rectangular, and the sub-pixel spatial profile may vary depending on the colour.

In FIGS. 6 (a) and (b) show the SEM and polarizing optical microscope images of 2D Gaussian nanostructured pixels respectively, with the overlaid Gaussian functions in x/y direction. In FIG. 6(a) the length and width of rectangular islands varies across the pixel in two directions. On the other hand, in FIG. 6(c) the length of rectangular islands varies across the pixel in only one direction. The optical images shown in FIG. 6(b) are obtained with two orthogonal analyzer conditions and a crossed-polarization state, showing gradient colour functions associated with each pixel. $\Lambda_x$ and $\Lambda_y$ is the grating period in x and y respectively. $\Delta L_x$ and $\Delta L_y$ are increase in the geometry of the nanostructures dictated by the Gaussian functions, where the total length of each structure is $L_0+\Delta L_x$ and $L_0+\Delta L_y$ for x-and-y dimensions respectively and $L_0$ is the initial length, 60 nm in this example (same for both axes).

Figure 6E:
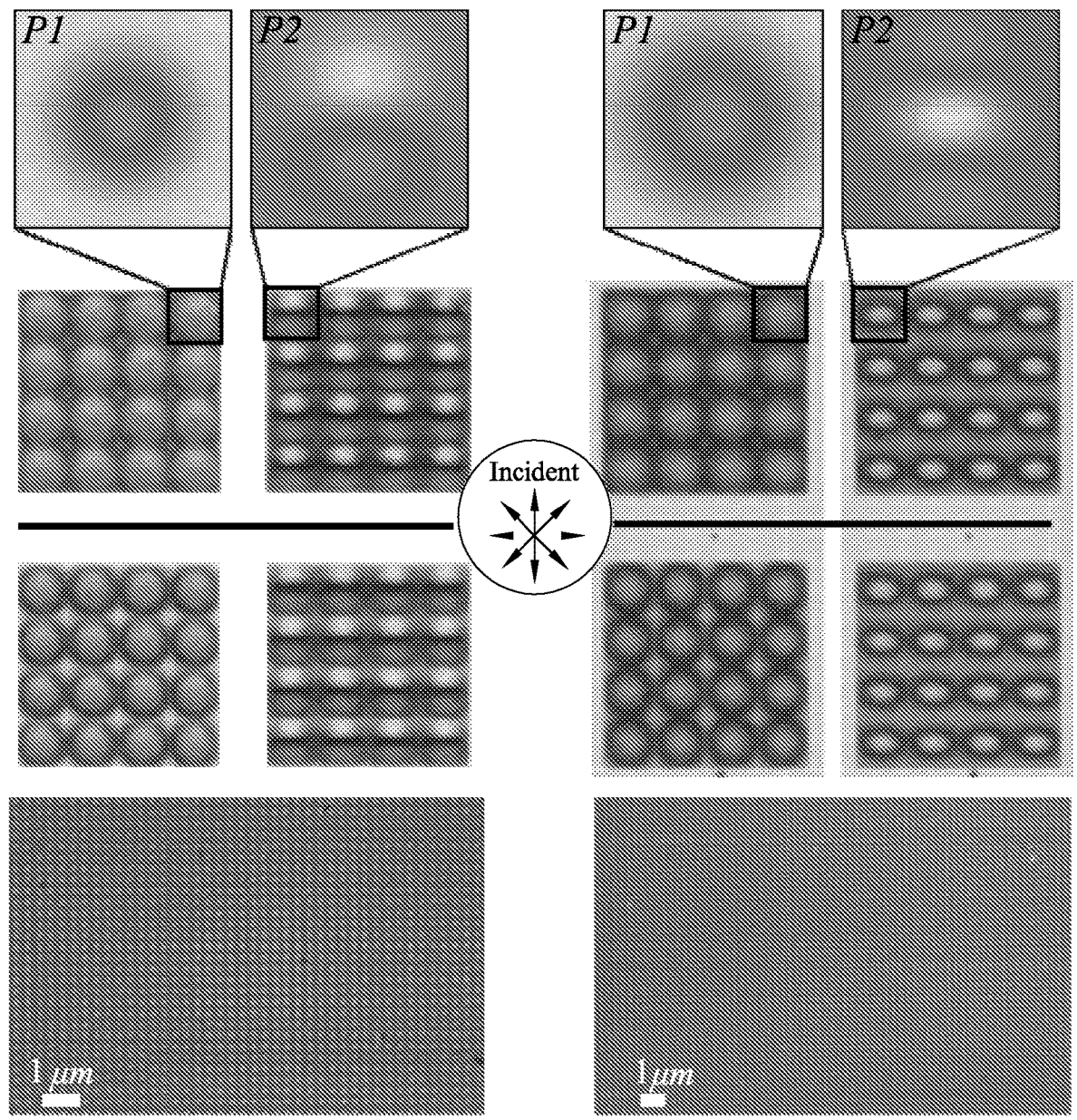
FIG. 6(e) shows the encoding of a 2D Gaussian with first-order partial derivative and second-order derivatives (Laplacian operator) for orthogonal polarization states.

Different polarizations correspond to different pixel colour/spatial functions. That is, a pixel function may be defined with polarization and wavelength dependent 2D profiles across the pixel. Moreover, gradient RGB colour profiles may be obtained across a single pixel, as shown in the optical microscope images in FIGS. 6(b) and 6(d). With specific reference to the intensity plots in FIG. 6(d), the RGB channels of the captured image are isolated for one pixel; there are varying 2D profiles for each wavelength (which is polarization controlled). FIG. 6(e) shows the encoding of a 2D Gaussian with first-order partial derivative and second-order derivatives (Laplacian operator) for orthogonal polarization states. In FIG. 6(e) Gaussian and Gaussian-derivative profiles for orthogonal polarizations are combined to show the potential for unconventional colour pixel reflector designs. In this type of pixel, the effective pixel shape and diffraction pattern (far-field) is controlled with an in-plane function encoded with nanostructures on the MIM reflector itself. MIM Gaussian pixels are useful, for example, for designing holographic display devices, which require a large amount of optical information to be available for modulation, per pixel, in order to form arbitrary optical field profiles. The diffraction pattern (far-field) of a display pixel is related to its aperture function by a Fourier transform. Hence, by giving the pixel an in-plane (aperture) function the (far field) diffraction pattern of the pixel can be defined. For example the far-field of a pixel shape (squircle) may be sinc-like in nature, resulting in unwanted higher-orders, but a Gaussian pixel (a Gaussian distribution of nanostructure dimensions in 1D or 2D), whose Fourier transform is another Gaussian, can offer an attractive solution to suppressing these artefacts.

A range of nanostructured plasmonic metapixel designs has been demonstrated which offer spectral control, for example full RGB control, and polarization control, for use as pixel elements in high-resolution reflective microdisplays.

One example pixel design comprises an ultra-thin Ag, SiO2 and Al back-reflector and exhibits multiple associated resonant absorption modes including surface plasmon and quasi-guided modes. Through the simultaneous excitation of resonant modes spectrally adjacent to the wavelength of interest colour filtering is achieved and the anisotropic nanostructured elements can also yield polarization control. Both 1D and 2D nanostructures for dual-resonant behaviour can lead to highly vivid colour pixel profiles. Furthermore, with isolated nanostructures, additional 2D (Gaussian) profiles across each pixel can be provided which may implement different 2D functions for different wavelengths. Because the effects can be polarization controlled, integration with liquid crystals (in particular with switchable waveplates) makes them useful for many microdisplay applications and technologies. The designs are compatible with existing manufacturing techniques—for example, aluminium is already the material of choice for existing pixel-reflectors and SiO2 is easy to deposit and long-lasting. In some implementations there is no need for pigment based filters and input polarizers for reflective display pixels. The MIM pixels may have in-plane spatial profiles which are not limited to the rectangular form-factor of a conventional pixel.

Pixels: Integration with Nematic Liquid Crystals

Figure 7A:
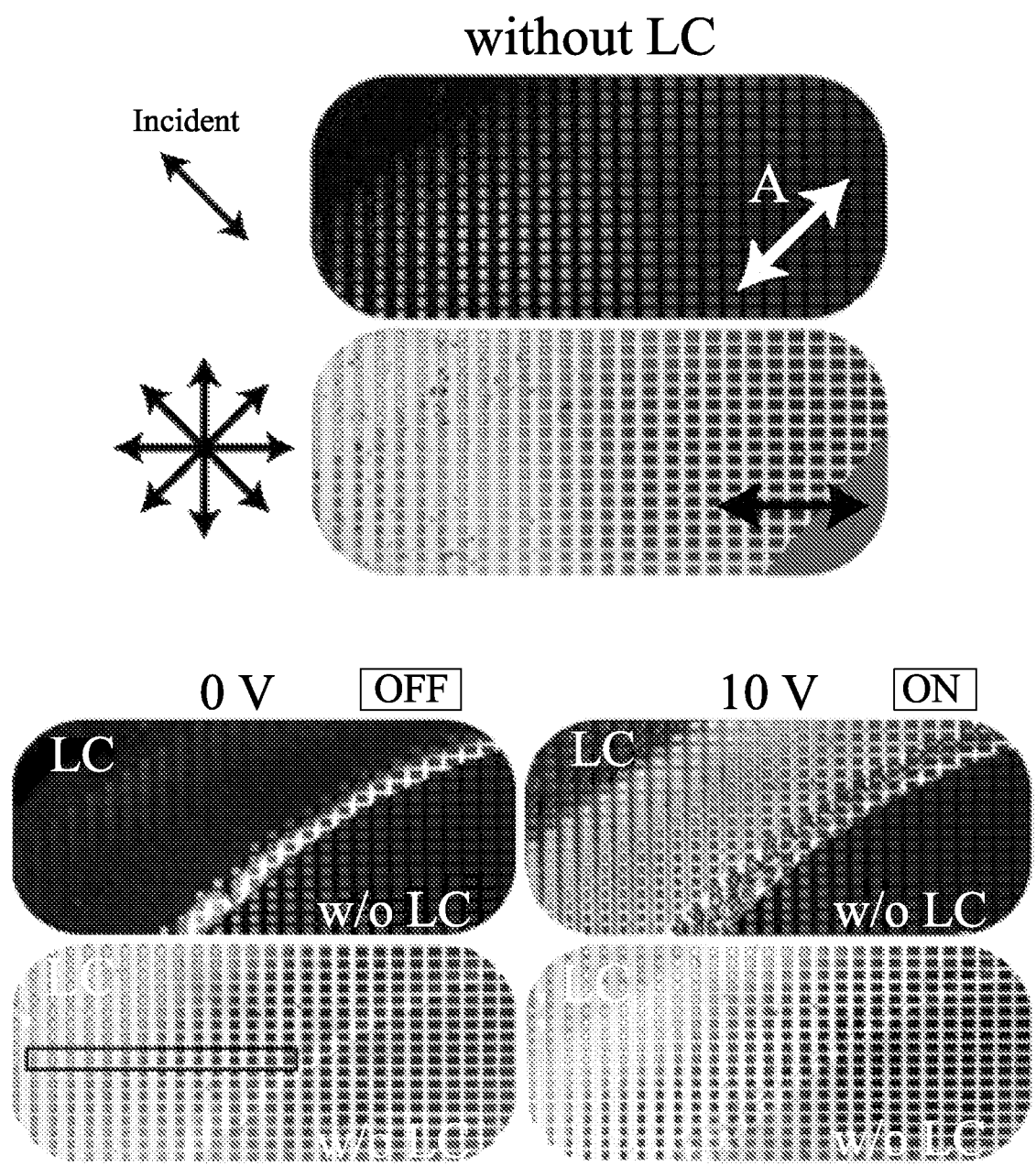
FIG. 7(a) shows polarising optical microscope images of the LC-integrated MIM gratings under a range of polarisation conditions.
Figure 7B:
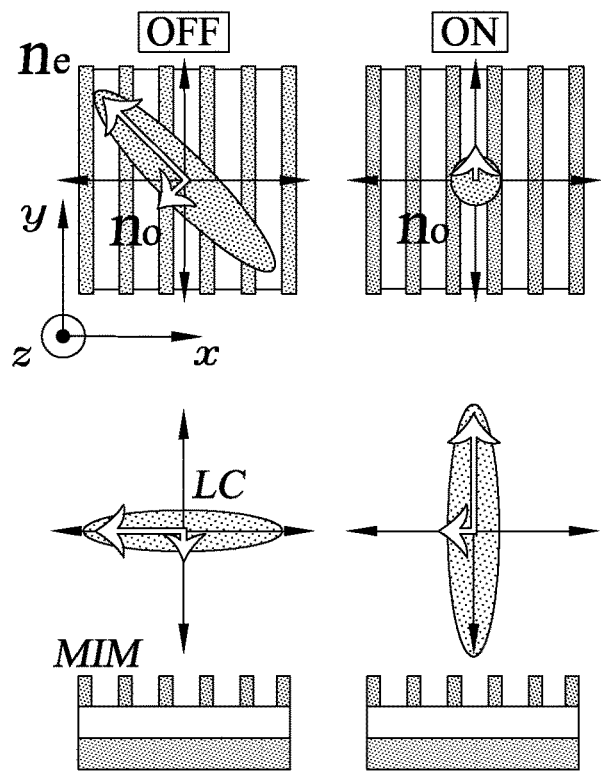
FIG. 7(b) shows a schematic illustration of LC electro-optic switching in OFF/ON (0/10V) states.
Figure 7C:
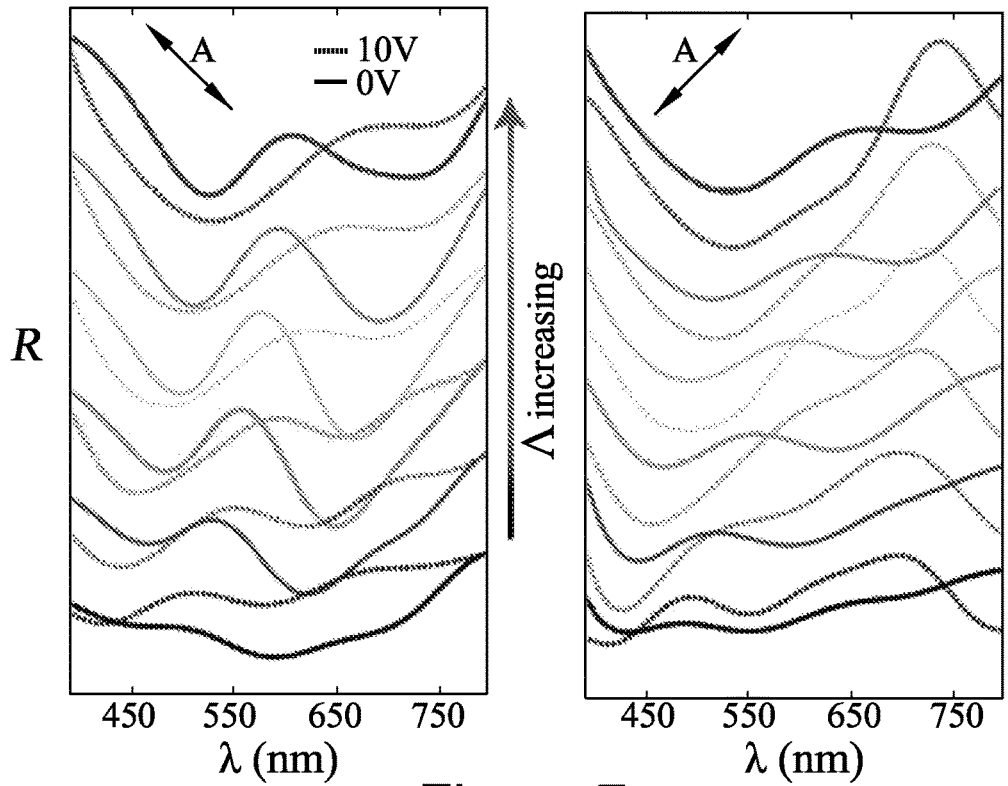
FIG. 7(c) shows reflection spectra under unpolarised incident light, with two 45° orthogonal analyser states.

MIM pixels as described above can exhibit high reflectance with polarisation and wavelength selectivity, and can include additional in-plane spatial information (for example with Gaussian devices). FIGS. 7(a) to 7(c) show the integration of nematic liquid crystals (LCs) (BLO48 mixture) with 1D MIM gratings. In an example the LCs are aligned at 45° to the gratings, and sealed with ITO-coated (top-electrode) glass to form the final device. The cell gap is 5 μm, with a rubbed AM4276 polyamide alignment layer on the top glass cover only. The off-state corresponds to the LC relaxed state i.e. aligned to the alignment layer (45°), hence an anisotropic in-plane index surrounding the structures. The on-state (10V) may be aligned perpendicularly to the cell, hence the surrounding in-plane index tensor is more isotropic (yet, though to a limited degree to due surface alignment issues with LCs and metallic structures) as shown schematically in FIG. 7(b).

Figure 8:
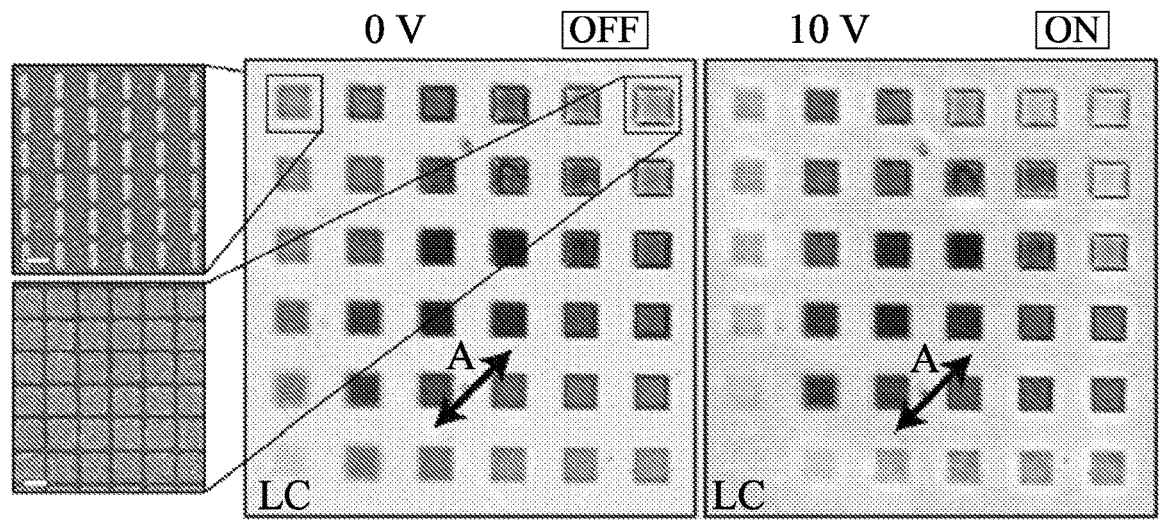
FIG. 8 shows optical microscopic images of integrating MIM 2D localized surface plasmon resonance (LSPR) structures (as shown in FIG. 5d) with nematic LCs under unpolarised incident light with 45° analyser state, under 0V and 10V.

FIG. 7(a) shows the effect of LC switching on the MIM gratings with varying polarisation conditions. In FIG. 7(c), the optical spectra are recorded with unpolarised light incident, but with two 45° orthogonal analyser conditions, under on/off LC states. The surrounding index tensor is manipulated by the application of the applied electric field, and hence the spectral response of the reflectors can be shifted. This is dependent on analyser state i.e. whether parallel to/perpendicular to the LC alignment state. FIG. 8 shows MIM 2D LSPR structures (large array A in FIG. 5(c)) integrated with nematic LCs. The two main optical microscope images are the array under unpolarised incident light and 45° analyser state, under 0V and 10V. The SEM images in FIG. 8 are taken before integration with LCs.

Figure 9:
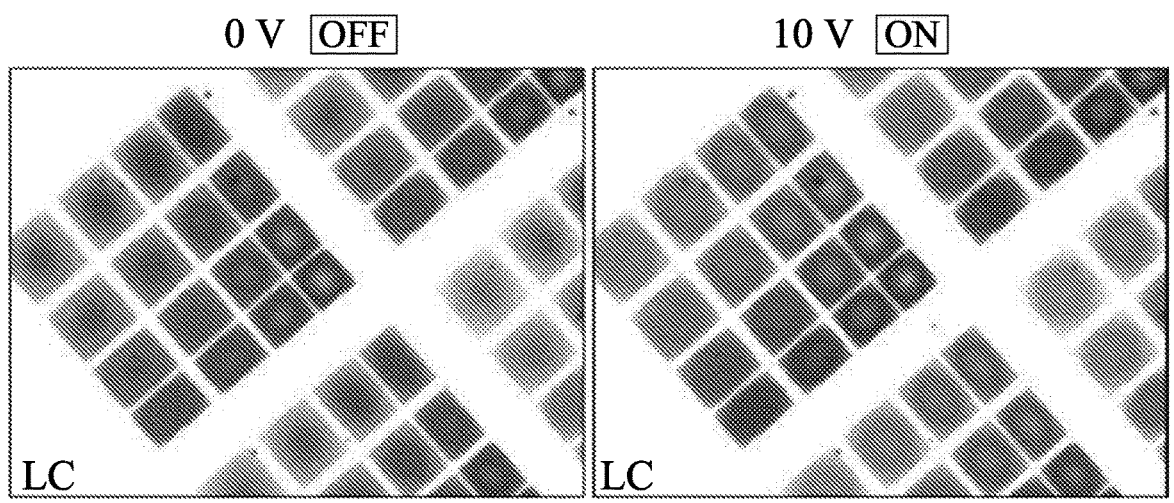
FIG. 9 shows optical microscopic images of integrating Gaussian MIM pixels (as shown in FIG. 6a) with nematic LCs under unpolarised incident light with 45° analyser state, under 0V and 10V.

FIG. 9 shows LC-integrated Gaussian MIM pixels [the Gaussian pixel array from device shown in FIG. 6(a)]. Under unpolarised incident light the nematic LCs are electro-optically switched from 0V (OFF state) to 10V (ON state). In this example, the analyser is at 45°.

Nanostructured metal-insulator-metal (MIM) pixels described above can offer one or more of the following advantages:

- Multiple resonances (plasmonic and waveguiding) which are wavelength (colour) specific and dependent on geometry.
- 1D MIM gratings can offer nearly any colour depending on geometry. This is because the colours can be subtracted/removed through absorptive resonances on either side of the target wavelength/colour.
- 2D MIM gratings (holes/islands) can offer nearly any colour and also, depending on polarisation, can offer more than just a single colour per pixel.
- Depending on density of pattern the 'pixel shape' (near/far-field) can be controlled.

Background Theory

Continuous MIM Layer FP-Cavity

Figure 10A:
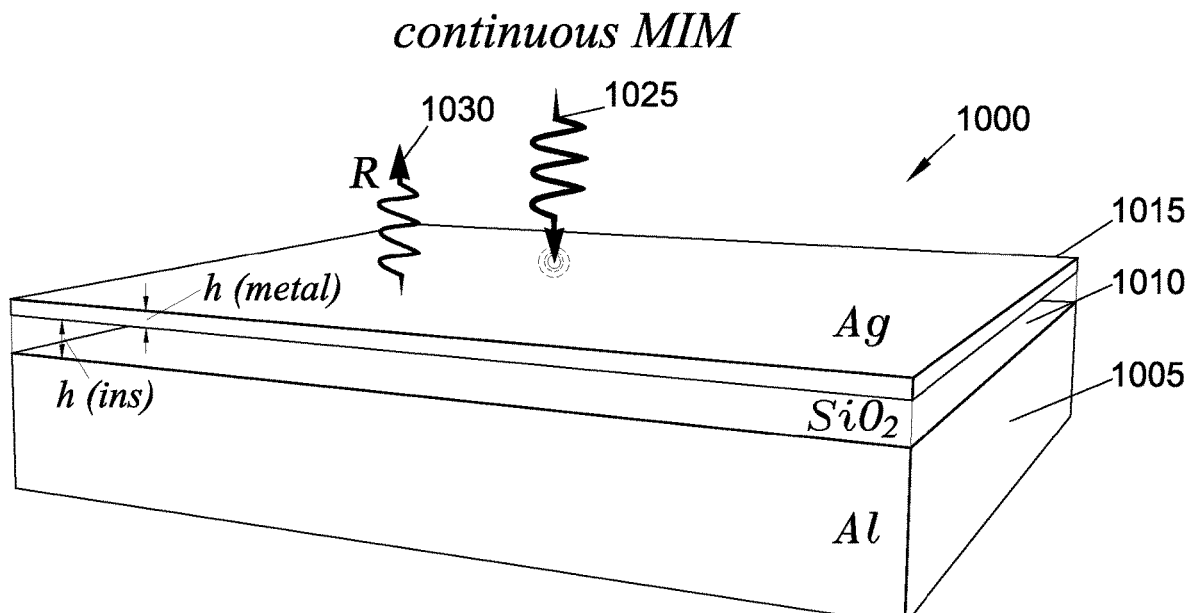
FIG. 10(a) shows a schematic diagram of a continuous MIM structure defining a Fabry-Perot MIM notch filter.
Figure 10B:
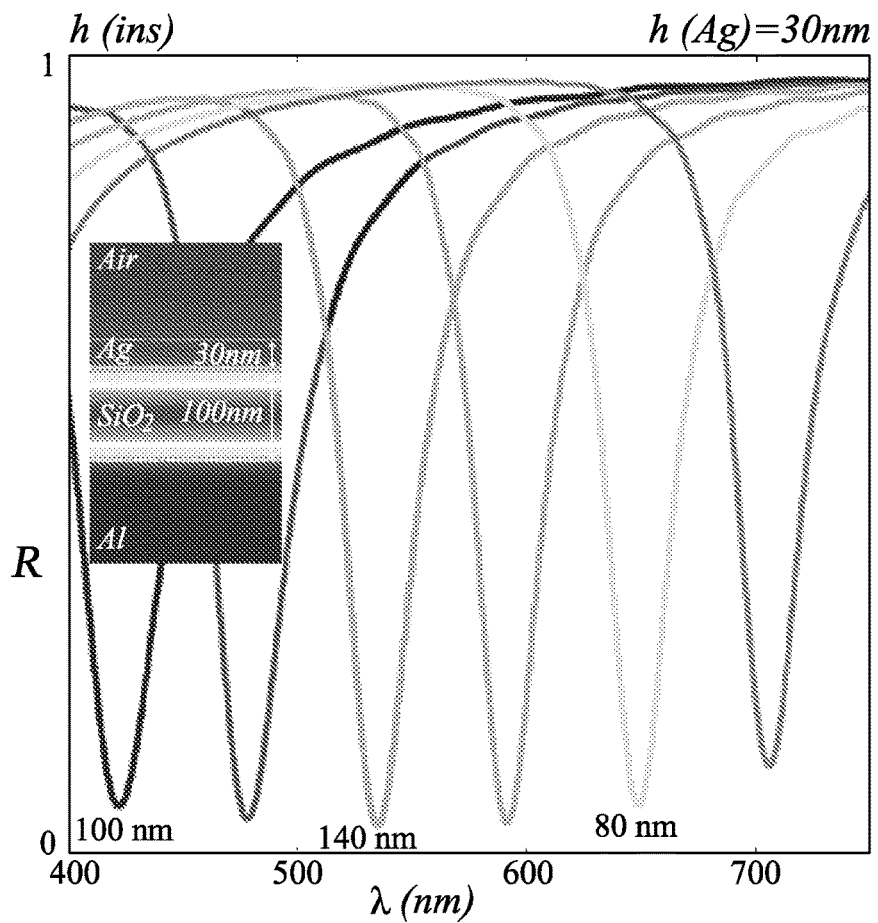
FIG. 10(b) shows simulated reflection spectra for a range of insulator thicknesses (the inset shows the E-field magnitude profile)

FIGS. 10(a) and 10(b) show a schematic diagram of a Fabry-Perot MIM notch filter comprising a continuous MIM structure 1000, and reflection results from varying the insulator thickness, with E-field magnitude respectively. To light with normal incidence upon the continuous metal-insulator-metal (MIM) cavity the structure acts as a Fabry-Perot filter, but with the etalon terminated by lossy mirrors (metals at optical frequencies). Through selection of the insulator thickness 1010 and top-layer thickness 1015, highly efficient notch-filtering can be achieved as illustrated with reference to the FDTD simulations shown in FIG. 10(b). In this example, the top metal layer is ultra-thin (30 nm) and the dielectric spacer thickness varies, which changes the total optical-path-length and contributes to the cavity Q-factor. The top and bottom layers act as lossy mirrors due to the lossy properties of metals at optical frequencies. Changing the dielectric thickness and top-layer thickness changes the Fabry-Perot cavity mode (CM) of the structure. The CM is at around 420-430 nm. At resonance, the E-field is highly concentrated in the central region of the cavity. For a back-mirror 1005 thickness greater than the metallic skin depth (tens of nanometers), narrow-band near-perfect absorption can be achieved, whereas for thicknesses similar to the top mirror transmission filtering is possible.

Nanostructured MIM Modes and Plasmonics

The transition from a continuous to a nanostructured ultra-thin top-layer in the MIM geometry allows the tailoring of the absorption properties and opens up the ability to excite a range of different modes. In order to excite SPPs, a phase-matching condition should be met. Because SPPs propagate parallel to a metal-dielectric interface (parallel wavevector), the wavevector of incident light should be coupled to a vector-component along this direction in order for SPP excitation. Hence, for light at normal incidence, to provide this extra momentum, periodic arrays of nanostructures are used i.e. the grating vector provides the additional component.

Grating-Coupled SPPs

Figure 11A:
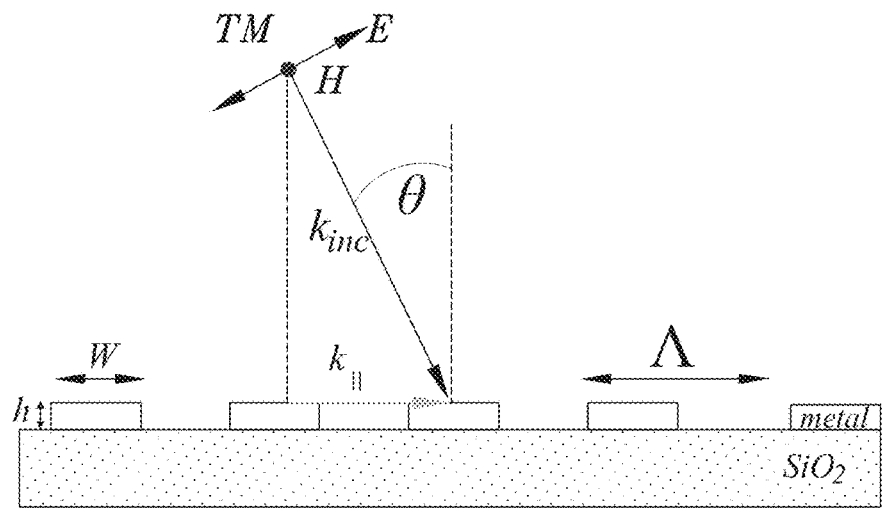
FIG. 11(a) shows a schematic illustration of a metal grating on a dielectric.
Figure 11B:
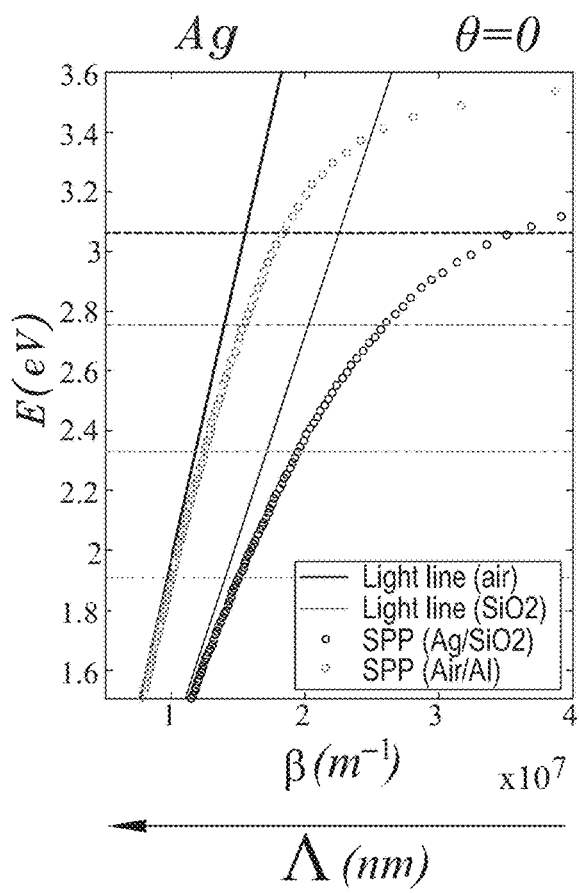
FIG. 11(b) shows a dispersion relation for a SPP (based on equation (2), later) for silver at normal incidence.
Figure 11C:
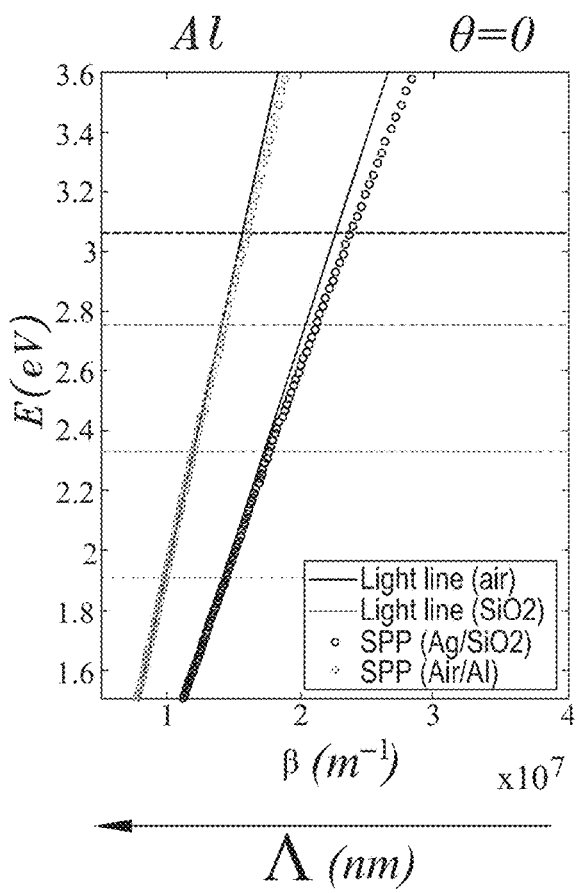
FIG. 11(c) shows a dispersion relation for a SPP (based on equation (2), later) for aluminium at normal incidence.

FIG. 11(a) shows a schematic diagram of a metal grating upon dielectric with associated parameters. The introduction of 1D or 2D periodicity allows the coupling of the incident momentum into a tangential component (through diffraction, into a range of orders), which permits the excitation of SPPs. Essentially, the periodic structure provides an in-plane wave-vector increase by a factor (1D) of $2\pi j = \Lambda$, where j is an integer multiplier, thus allowing the excitation of SPPs at normal incidence. Strong coupling between SPPs and the diffracted modes occurs when eqn. 1 is satisfied, $$k_{SPP} = k_{\parallel} + k_G \quad (1)$$

$$k_{SPP} = k_0 \left[ \frac{\varepsilon_m(\lambda) \cdot \varepsilon_d(\lambda)}{\varepsilon_m(\lambda) + \varepsilon_d(\lambda)} \right]^{\frac{1}{2}}, \quad (2)$$

$$k_G = \pm m \frac{2\pi}{\Lambda_x} \pm n \frac{2\pi}{\Lambda_y},$$

$$m, n = 1, 2 \ldots N$$

where $k_{\parallel} = k_0 \sin \theta_{xy,inc}$ is in incident wave-vector (free-space), $k = k_0 \varepsilon^{1/2}$ and $k_0 = w/c = 2\pi/\lambda$. $k_{SPP}$ is the wave-vector for a SPP between $\varepsilon_m$ and $\varepsilon_d$. The real part of the propagation constant determines the SPP wavelength, which is always smaller than the light wavelength in the dielectric $\lambda_{SPP} = 2\pi/\Re k_{SPP}$. The dispersion relations for SPPs (Ag and Al) are shown in FIGS. 11(b) and 11(c) respectively. Thus, by sweeping $\Lambda$ it is possible to intersect the associated SPP dispersion and excite SPPs.

Localized Resonances

The 1D gratings offer singular polarization and wavelength selectivity, however a second characteristic can be obtained by utilizing isolated anisotropic nanostructure arrays. Isolated nanostructures exhibit localized modes: resonant modes confined to individual metal structures. When the mean-free-path of the metal's electrons is greater than the actual physical dimensions of a metal, a quantization of the plasmon frequency occurs. This is a collective charge density oscillation of the conduction electrons which has been excited, referred to as a localized surface plasmon resonance (LSPR) (the 1D array can also offer localized resonances). Upon illumination, with incident light having a component with the plasmon frequency, a strong extinction (absorption+scattering) of light at that wavelength will occur. Metallic nanoparticles offer large extinction coefficients (energy removed from the system=absorption+scattering). Mie theory in combination with Rayleigh-Gans theory accurately describes the optical response of isolated and small groups of nanoparticles. In the quasi-static limit, the scattering and absorption cross sections, $\sigma_{scat}$ and $\sigma_{abs}$, of an ellipsoid can be defined as:

$$\sigma_{scat} = \frac{k^4}{6\pi}|\alpha_j|^2, \quad (3)$$

$$\sigma_{abs} = k\mathcal{J}|\alpha_j|$$

where k is the wavenumber, $\alpha_j$ is the complex polarizability of the structure, with j=a, b, c, corresponding to three semi-axes of an ellipsoid, where each axis has its own polarizability, with depolarization factor for each axis. Thus, the extinction properties vary depending on the axis (input polarization state). The extinction cross section, $\sigma_{ext}$, is a summation of the two. For spheres, $\alpha \propto R^3$, and hence because $\sigma_{abs} \propto R^3$ compared to that of $\sigma_{scat} \propto R^6$, at small particle radii, absorption dominates over scattering. Furthermore, the unit cell and periodicity will have an effect on the optical output and is a summation of the power scattered from each induced dipole.

Figure 12:
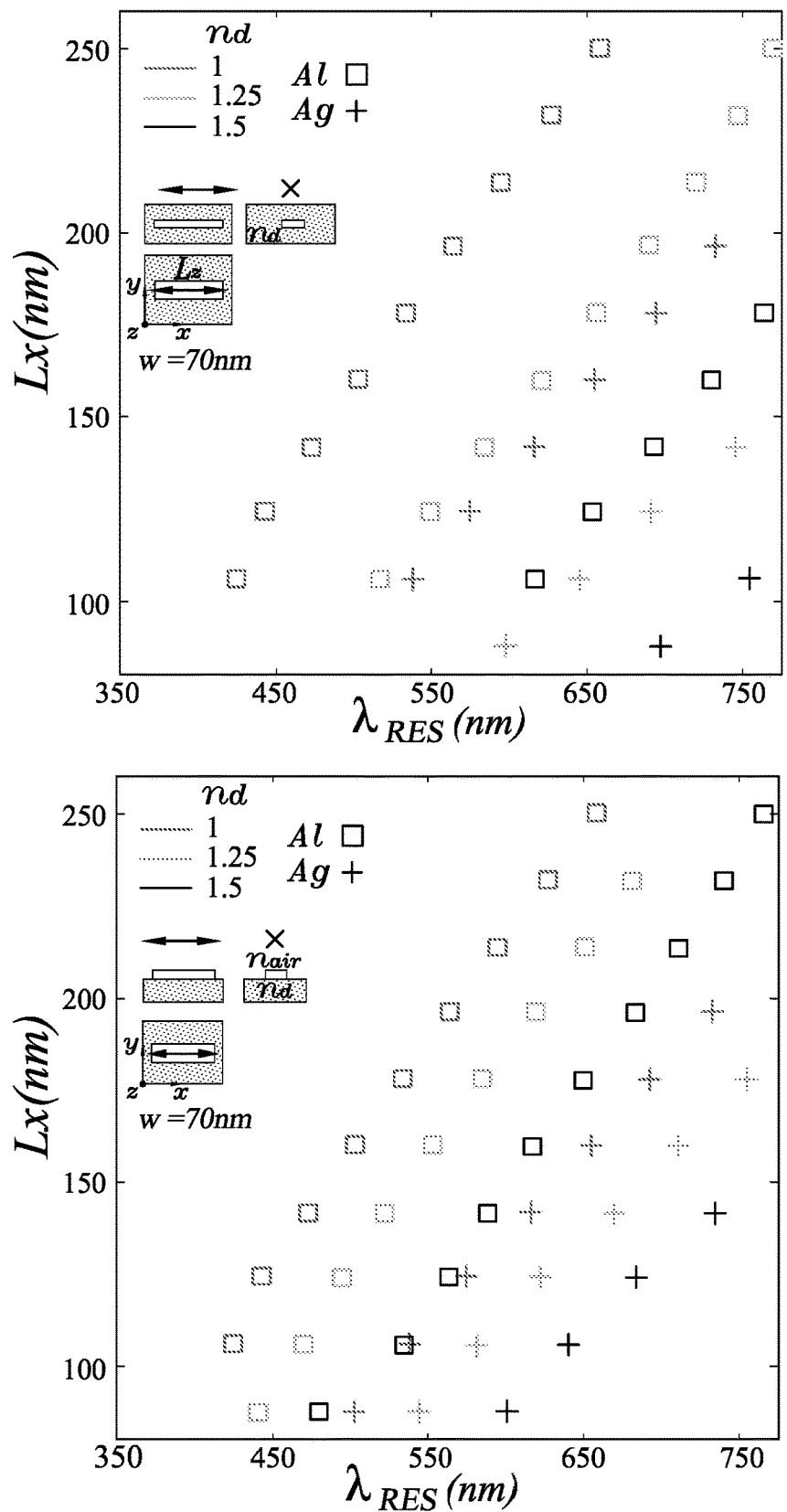
FIG. 12 shows LSPR of arrays of nanostructures: the resonant mode peak wavelength associated with the LSPR is taken from scattering-cross-section FDTD simulations for a range of isotropic dielectric background indices.

FDTD simulations (Lumerical Inc. FDTD solutions) are performed, as shown in FIG. 12, highlighting the effective linear scaling of Ag nanostructures on different substrates. In free space, the particle scattering resonance is dominated by a LSPR. The presence of an interface breaks the symmetry, and the mode is localized at the interface with the substrate. The efficiency changes and asymmetry is introduced. At short wavelengths, a dipole-like, free space resonance dominates, while at long wavelengths, the resonance can be attributed to the excitation of resonant SPP modes at the particle/substrate interface.

Guided Modes

In the described pixel geometry (multi-layer system) there are areas such as insulator-metal-insulator (IMI) and metal-insulator-metal (MIM) areas where many different SPP modes can exist. A top-layer nanostructure scatters into a range of k-vectors and IMIs and MIMs can act as waveguides (plasmonic/oscillatory modes). Hence it is possible that one or more of the scattered wave-vectors can be coupled into a waveguiding mode. The origin of plasmonic waveguides is based on the excitation and waveguiding of SPPs at the interfaces in MIM or IMI geometries. Due to the symmetry of the MIM structure, generally the associated characteristic dispersion relation splits into two equations, describing symmetric (long-range SPP (LR-SPP)) and anti-symmetric modes (short-range SPP (SR-SPP)).

The characteristic equations of a MIM wave-guiding structure are:

$$\tanh\left(\frac{k_i t}{2}\right) = -\frac{\varepsilon_d k_m}{\varepsilon_m k_d} \quad i.\text{ symmetric mode} \quad (4)$$

$$\coth\left(\frac{k_i t}{2}\right) = -\frac{\varepsilon_d k_m}{\varepsilon_m k_d} \quad ii.\text{ anti-symmetric mode}$$

$$\text{where,} \quad k_{m,d} = [k_z^2 - \varepsilon_{m,d} k_0^2]^{\frac{1}{2}} \quad (5)$$

In one example, for a MIM structure with small dielectric thickness of <100 nm (with semi-infinite metal boundaries), only the fundamental mode $TM_0$ exists. Note that the $TM_0$ mode is plasmonic in nature for any dielectric thickness.

Figure 13:
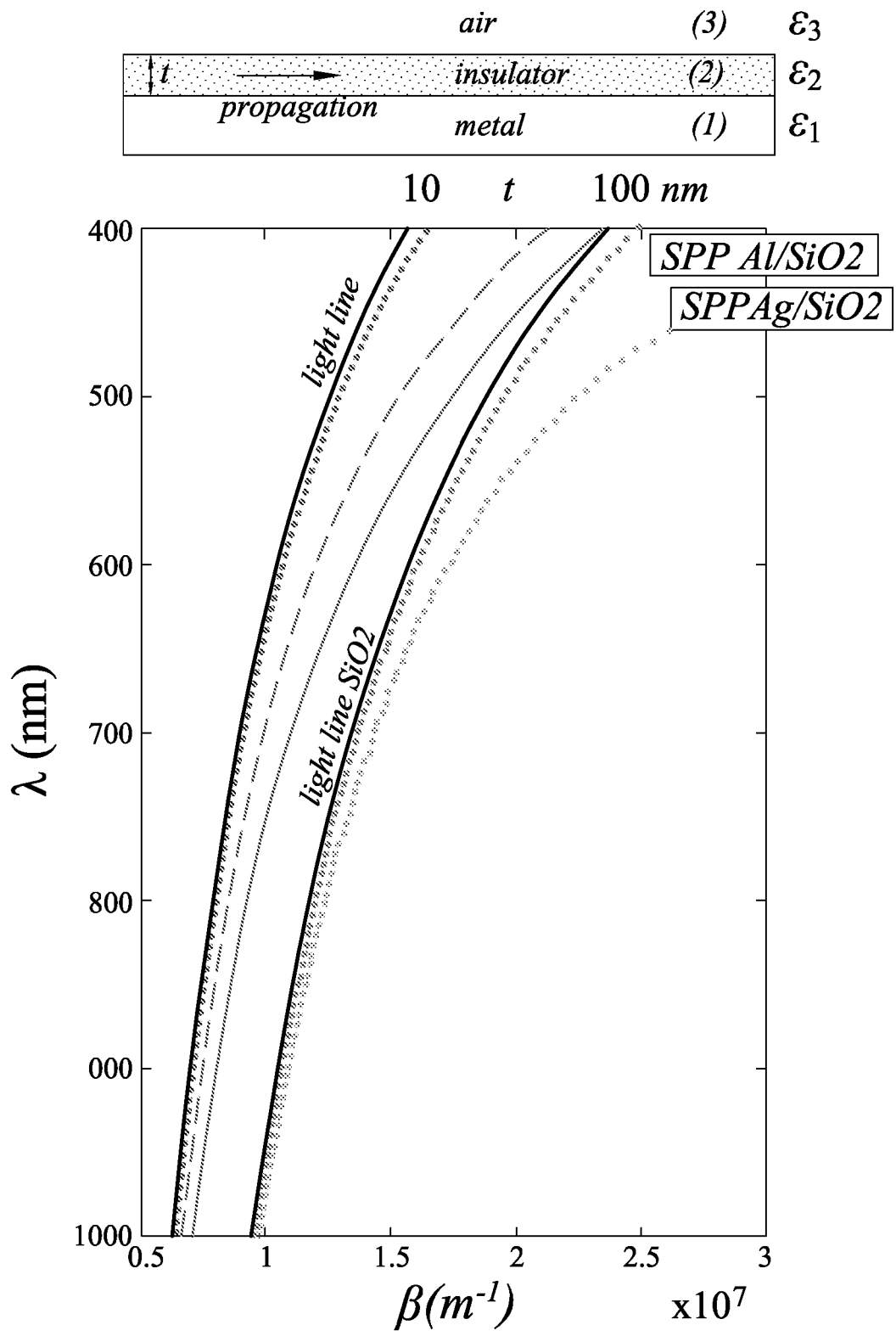
FIG. 13 shows a schematic diagram of a metal-insulator-air geometry and dispersion relations of the guided modes with varying dielectric thickness.

FIG. 13 shows a schematic and labelling of Metal-insulator-air (M-I-A) structure and dispersion relations of the guided modes with varying dielectric thickness (with refractive index, n=1.5, approximately that of SiO2, but kept constant in order to rule out effects based on dispersion within the insulator). Typical SPP dispersions and light lines are also plotted for comparison.

For a 3-layer metal-insulator-air system, FIG. 13 (Al-SiO2-air), the dispersion relation becomes, $$k_{x2}t_2 = \tan^{-1}\left(K_{21}\frac{ik_{x1}}{k_{x2}}\right) + \tan^{-1}\left(K_{23}\frac{ik_{x3}}{k_{x3}}\right) \quad (6)$$

$$\text{where,} \quad K_{ij} = \frac{\varepsilon_i}{\varepsilon_j} \quad (TM)$$

$$k_{xi}^2 = k_i^2 - k_z^2 = \varepsilon_i k_0^2 - k_z^2 \quad (7)$$

The dispersion curve of these guided modes in this asymmetric metal-insulator-air (M-I-A) structure lie in the region between the curves labelled "light line" (of the air) and "light line SiO2" (of the insulator). The equations above may be solved numerically (e.g. using MATLAB), and solutions are shown in FIG. 13 (Al-SiO2-air). With increasing insulator thickness, the fundamental mode becomes more greatly confined to the insulator, shown through the bending of the dispersion toward the insulator light line (lower energies).

To explore the available pixel characteristics, material thickness requirements, required periodicity and so forth, finite difference time domain (FDTD) simulations may be performed. Due to symmetry arguments with the gratings, the simulations may be performed in 2D with periodic boundary conditions at the varying unit-cell boundaries.

In the simulations, as the insulator (SiO2) increases from 10 nm to 150 nm multiple absorption mode branches are observed. As the thickness increases the shorter wavelength mode splits and two absorption modes appear at approximately 60 nm.

In an example implementation the top Ag layer and SiO2 layer are 30 nm and 100 nm respectively. This example is based on a compromise between an ultra-thin device, optimal performance for dual-resonance (minimum) behaviour, limiting to just one QGM and other factors. By optimising the thicknesses a flexible system can be obtained whereby a few modes are present and can be controlled easily.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. An optical device having a plurality of coloured pixels, each said pixel comprising a filter structure, the filter structure comprising:
   a first metallic layer;
   a dielectric layer over said first metallic layer; and
   a second metallic layer over said dielectric layer;
   wherein said second metallic layer comprises a nanostructured metallic layer having a lateral structure with features having at least one characteristic lateral dimension equal to or less than 1 µm, and wherein said second metallic layer is structured to couple light incident on said second metallic layer into at least two simultaneously present absorption mode peaks of the filter structure, one to either side of a target wavelength, such that said filter structure appears coloured at said target wavelength in reflected or transmitted light, the optical device further comprising a controllable polarizer in an optical path through the filter structure, wherein the controllable polarizer is configured to select an optical response of the pixel, wherein said selection of the optical response comprises controlling a colour of the pixel; and wherein a dominant mode of a first of said absorption mode peaks comprises a surface plasmon mode, and wherein a dominant mode of a second of said absorption mode peaks comprises a simultaneously present guided mode.

2. An optical device as claimed in claim 1 wherein said nanostructured metallic layer is laterally anisotropic such that said filter structure has a first optical response to a first polarisation of said incident light and a second, different optical response to a second polarisation of said incident light orthogonal to said first polarisation.

3. An optical device as claimed in claim 2 wherein said first optical response comprises appearing at a first colour, and wherein said second optical response comprises appearing at a second, different colour or having a substantial absence of colour.

4. An optical device as claimed in claim 1, wherein said second metallic layer has a lateral structure defining a 1D grating.

5. An optical device as claimed in claim 4 wherein said 1D grating is different for different pixels of the device such that different pixels exhibit different colours in reflected or transmitted light.

6. An optical device as claimed in claim 1 wherein said second metallic layer has a lateral structure defining a plurality of apertures or islands over a lateral region of a pixel.

7. An optical device as claimed in claim 6 wherein said plurality of apertures or islands comprises a 2D array of metallic islands.

8. An optical device as claimed in claim 6 wherein said lateral structure has a first geometry in a first lateral direction and a second, different geometry in a second orthogonal lateral direction.

9. An optical device as claimed in claim 1 wherein the controllable polariser comprises a region of electrically controllable liquid crystal material.

10. An optical device as claimed in claim 1 wherein said at least one characteristic lateral dimension of the lateral structure changes across the filter structure to control a far-field diffraction pattern of the pixel.

11. An optical device as claimed in claim 1 wherein a thickness of the dielectric layer (110) is less than 300 nm.

12. An optical device as claimed in claim 11 wherein the thickness of the dielectric layer (110) is less than 150 nm.

13. A method applied to an optical device, of defining the optical response of an optical filter element of the optical device comprising an optical cavity, the optical cavity comprising a first metallic layer, a dielectric layer over said first metallic layer, and a second metallic layer over said dielectric layer, the method comprising:

configuring a structure of the second metallic layer to couple light incident on the optical cavity simultaneously into two different mode peaks of the optical cavity, to absorb said incident light at two different wavelengths, one to either side of a target wavelength, such that said structure appears coloured at said target wavelength in reflected or transmitted light; and controlling a polarisation of said incident light to select said optical response of the optical filer element, wherein said selection of the optical response comprises controlling the colour of the optical filer element;

wherein a dominant mode of a first of said absorption mode peaks comprises a surface plasmon mode, and wherein a dominant mode of a second of said absorption mode peaks comprises a simultaneously present guided mode.

14. A method as claimed in claim 13 comprising configuring the second metallic layer as a 1D or 2D array of apertures in a metallic sheet or as a 1D or 2D array of metallic islands.

15. A method as claimed in claim 14 wherein further comprising varying a geometry of said 1D or 2D array over a lateral area of the optical filter element to vary an effective near or far field shape of the optical filter element.

16. A method applied to an optical device, of defining an optical response of an optical filter element of the optical device comprising an optical cavity, the optical cavity comprising a first metallic layer, a dielectric layer over said first metallic layer, and a second metallic layer over said dielectric layer, the method comprising:

configuring the second metallic layer as a 1D or 2D array of apertures in a metallic sheet or as a 1D or 2D array of metallic islands to couple light incident on the optical cavity into at least one surface plasmon resonant mode of the optical cavity, and varying a geometry of said 1D or 2D array over a lateral area of the optical filter element to vary an effective near or far field shape of the optical filter element, wherein said configuring comprises configuring a structure of the second metallic layer to couple light incident on the optical cavity simultaneously into two different mode peaks of the optical cavity, to absorb said incident light at two different wavelengths, one to either side of a target wavelength, such that said structure appears coloured at said target wavelength in reflected or transmitted light; and controlling a polarisation of said incident light to select said optical response of the optical filer element, wherein said selection of the optical response comprises controlling the colour of the optical filer element;

wherein a dominant mode of a first of said absorption mode peaks comprises a surface plasmon mode, and wherein a dominant mode of a second of said absorption mode peaks comprises a simultaneously present guided mode.

17. A method as claimed in 16 wherein at least one of said modes comprises a surface plasmon resonant mode of said cavity.

* * * * *